(12) United States Patent
Levinson et al.

(10) Patent No.: US 12,625,947 B2
(45) Date of Patent: May 12, 2026

(54) ISOLATED RUNTIME ENVIRONMENTS FOR SECURING SECRETS USED TO ACCESS REMOTE RESOURCES FROM COMPUTE INSTANCES

(71) Applicant: Amazon Technologies, Inc., Seattle, WA (US)

(72) Inventors: Joshua Benjamin Levinson, Seattle, WA (US); Colm MacCarthaigh, Seattle, WA (US); Alexander Graf, Nuremberg (DE); Iulia-Daniela Doras-Prodan, Bucharest (RO); Petre Eftime, Buchare (RO)

(73) Assignee: Amazon Technologies, Inc., Seattle, WA (US)

( * ) Notice: Subject to any disclaimer, the term of this patent is extended or adjusted under 35 U.S.C. 154(b) by 910 days.

(21) Appl. No.: 17/810,291

(22) Filed: Jun. 30, 2022

(65) Prior Publication Data

US 2024/0095338 A1     Mar. 21, 2024

(51) Int. Cl.
G06F 9/455 (2018.01)
G06F 21/53 (2013.01)
H04L 9/08 (2006.01)

(52) U.S. Cl.
CPC .............. G06F 21/53 (2013.01); G06F 9/455 (2013.01); H04L 9/0891 (2013.01); G06F 2221/2149 (2013.01)

(58) Field of Classification Search
CPC .. G06F 21/53; G06F 9/455; G06F 2221/2149; G06F 11/3006; G06F 11/301; G06F 21/44; G06F 21/602; G06F 21/64; G06F 9/45558; G06F 2009/45562; G06F 2009/45587; H04L 9/0891; H04L 63/10
See application file for complete search history.

(56) References Cited

U.S. PATENT DOCUMENTS

| | | | |
|---|---|---|---|
| 5,204,949 A | 4/1993 | Yasue et al. | |
| 9,626,512 B1 * | 4/2017 | Brandwine | ......... G06F 9/45533 |
| 10,353,831 B2 | 7/2019 | Robinson et al. | |
| 2007/0050764 A1 | 3/2007 | Traut | |
| 2007/0239987 A1 | 10/2007 | Hoole et al. | |

(Continued)

OTHER PUBLICATIONS

AMD, "Secure Encrypted Virtualization API Version 0.16 Technical Preview", Advanced Micro Devices, Publication 55766, Revision 3.06, Feb. 2018. pp. 1-99.

(Continued)

*Primary Examiner* — Jorge A Chu Joy-Davila
(74) *Attorney, Agent, or Firm* — Robert C. Kowert; Kowert, Hood, Munyon, Rankin & Goetzel, P.C.

(57) ABSTRACT

An instance secrets management isolated runtime environment is launched at a virtualization server, and utilizes a subset of memory assigned to a compute instance. The subset of memory is inaccessible from entities external to the runtime environment. A secrets manager of the runtime environment provides a security artifact to an application, running at the compute instance, which has requested access to a resource. The artifact is generated by the secrets manager using a security secret associated with the compute instance; the secret is not accessible to programs external to (Continued)

the runtime environment. In response to a determination that the artifact is valid, the application obtains access to the resource.

20 Claims, 10 Drawing Sheets

(56) References Cited

U.S. PATENT DOCUMENTS

| | | | |
|---|---|---|---|
| 2010/0208898 A1* | 8/2010 | Acar ..................... | H04L 9/0833 380/280 |
| 2013/0054948 A1 | 2/2013 | Raj et al. | |
| 2014/0053272 A1 | 2/2014 | Lukacs et al. | |
| 2014/0237464 A1 | 8/2014 | Waterman et al. | |
| 2015/0007175 A1 | 1/2015 | Potlapally et al. | |
| 2015/0128240 A1 | 5/2015 | Richards et al. | |
| 2015/0324215 A1 | 11/2015 | Borthakur | |
| 2016/0134623 A1 | 5/2016 | Roth et al. | |
| 2016/0357988 A1 | 12/2016 | Ferguson et al. | |
| 2016/0373474 A1 | 12/2016 | Sood et al. | |
| 2017/0024570 A1 | 1/2017 | Pappachan et al. | |
| 2017/0109187 A1 | 4/2017 | Cropper et al. | |
| 2017/0244557 A1 | 8/2017 | Riel | |
| 2018/0114000 A1 | 4/2018 | Taylor | |
| 2018/0159771 A1 | 6/2018 | Malloy et al. | |
| 2018/0239638 A1 | 8/2018 | Inami | |
| 2019/0097971 A1 | 3/2019 | Coleman et al. | |
| 2019/0102526 A1* | 4/2019 | Koul ..................... | G06F 21/31 |
| 2019/0268318 A1 | 8/2019 | Tsirkin | |
| 2020/0267004 A1* | 8/2020 | Lounsberry .......... | H04L 9/3265 |
| 2020/0310855 A1 | 10/2020 | Liguori et al. | |
| 2021/0132975 A1 | 5/2021 | Chandrashekar | |

OTHER PUBLICATIONS

Ttai Anati, et al., "Innovative Technology for CPU Based Attestation and Sealing", Retrieved from hllps://software.intel.com/en-us/articles/innovative-technology-for-cpu-based-attestation-and-sealing on Feb. 9, 2019, pp. 1-19.
Fengzhe Zhang, "CloudVisor: Retrofitting Protection of Virtual Machines in Multi-tenant Cloud with Nested Virtualization", dated Oct. 23-26, 2011, pp. 1-14.
Min Zhu et al, "HA-VMSI: A Lightweight Virtual Machine Isolation Approach with Commodity Hardware for ARM", dated Apr. 8-9, 2017, pp. 1-15.
Paul Sangster et al, "Virtualized Trusted Platform Architecture Specification", dated Sep. 27, 2011, pp. 1-60.
U.S. Appl. No. 16/368,747, filed Mar. 38, 2019, Anthony Nicholas Liguori.
U.S. Appl. No. 16/676,329, filed Nov. 6, 2019, Samartha Chandrashekar.
U.S. Appl. No. 17/020,634, filed Sep. 14, 2020, Samartha Chandrashekar.
U.S. Appl. No. 17/020,642, filed Sep. 14, 2020, Samartha Chandrashekar.
International Search Report and Written Opinion mailed Oct. 9, 2023 in PCT/US2023/068588, Amazon Technologies, Inc., pp. 1-12.
Min Zhe, et al., "HA-VMSI: A Lightweight Virtual Machine Isolation Approach with Commodity Hardware for ARM," Virtual Execution Environments, Apr. 8, 2017, pp. 242-256, ACM, New York, NY.

* cited by examiner

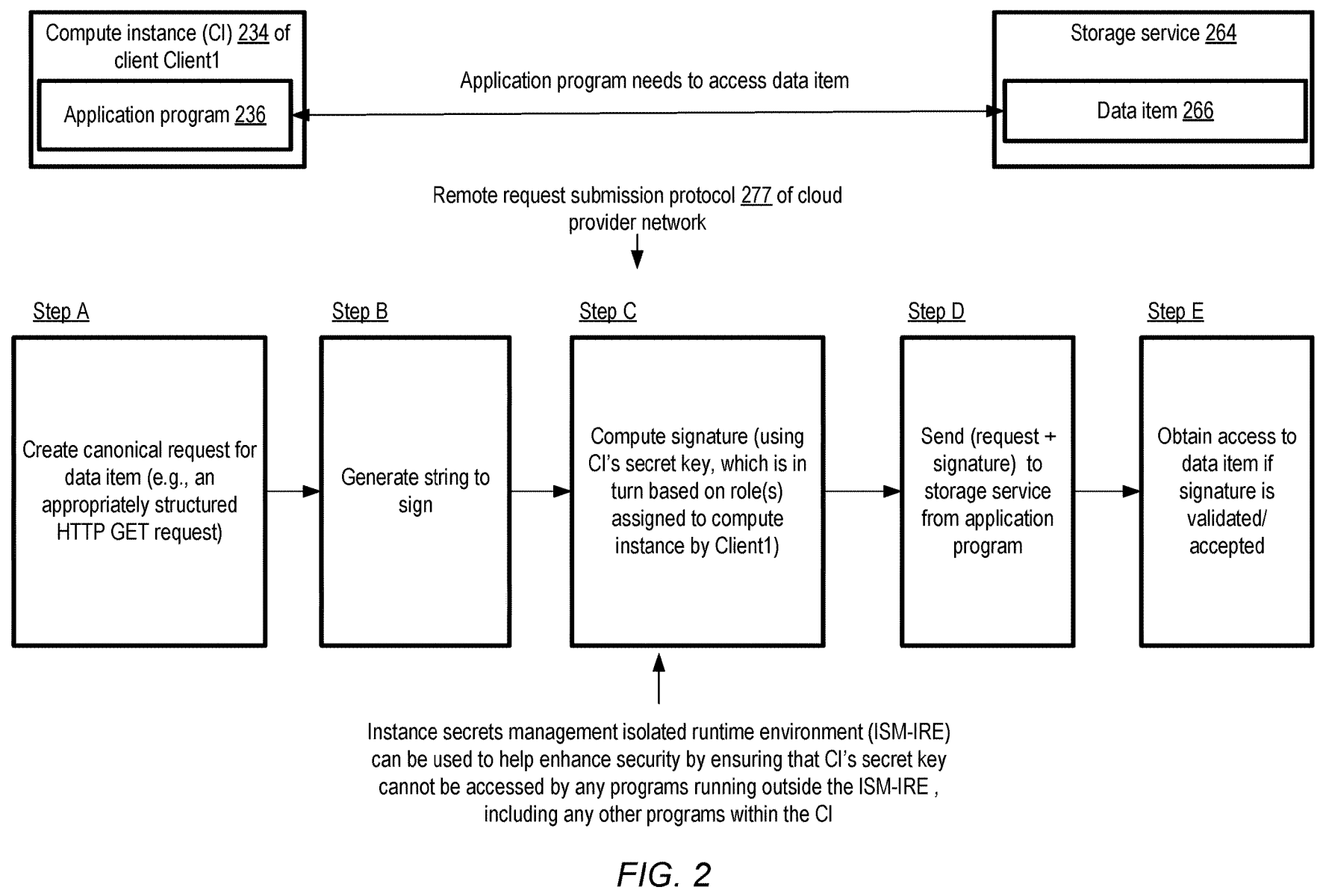

Storage service 264

Data item 266

Compute instance (CI) 234 of client Client1

Application program 236

Application program needs to access data item

Remote request submission protocol 277 of cloud provider network

Step A

Create canonical request for data item (e.g., an appropriately structured HTTP GET request)

Step B

Generate string to sign

Step C

Compute signature (using CI's secret key, which is in turn based on role(s) assigned to compute instance by Client1)

Step D

Send (request + signature) to storage service from application program

Step E

Obtain access to data item if signature is validated/ accepted

Instance secrets management isolated runtime environment (ISM-IRE) can be used to help enhance security by ensuring that CI's secret key cannot be accessed by any programs running outside the ISM-IRE, including any other programs within the CI

FIG. 2

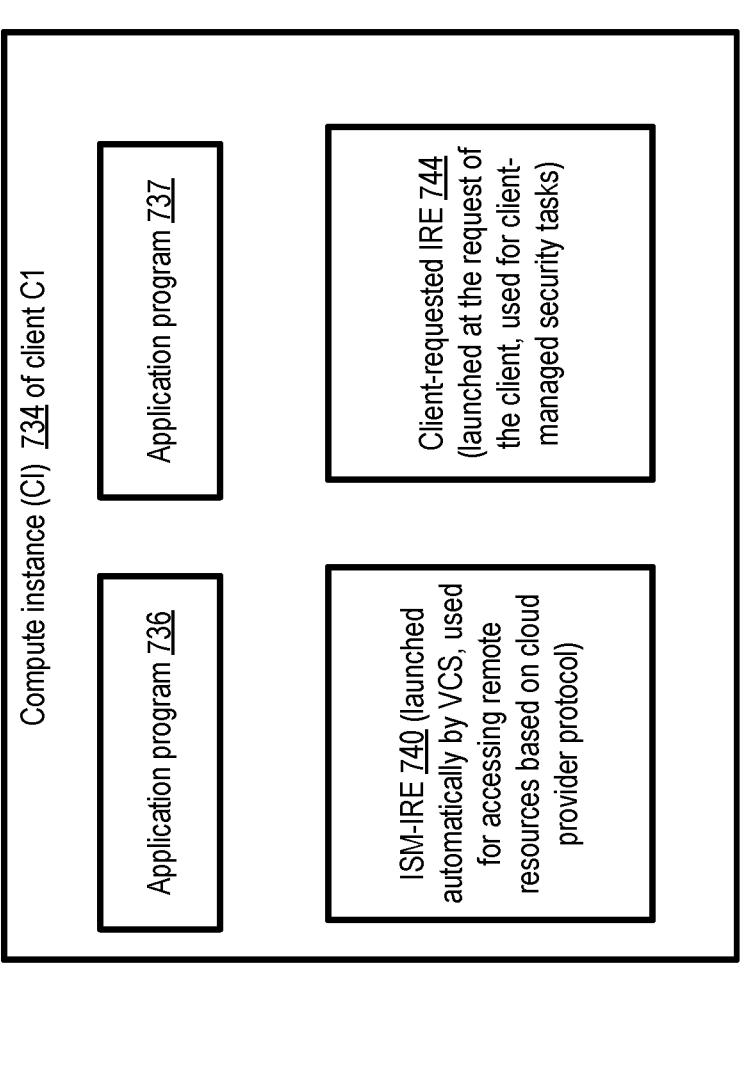

Compute instance (CI) 734 of client C1

Application program 737

Application program 736

Client-requested IRE 744 (launched at the request of the client, used for client-managed security tasks)

ISM-IRE 740 (launched automatically by VCS, used for accessing remote resources based on cloud provider protocol)

Memory 777 (initially allocated to parent CI 734)

Segregated memory subset 778 (set aside for use exclusively by ISM-IRE 740)

Segregated memory subset 779 (set aside for use exclusively by client-requested IRE 744)

FIG. 7

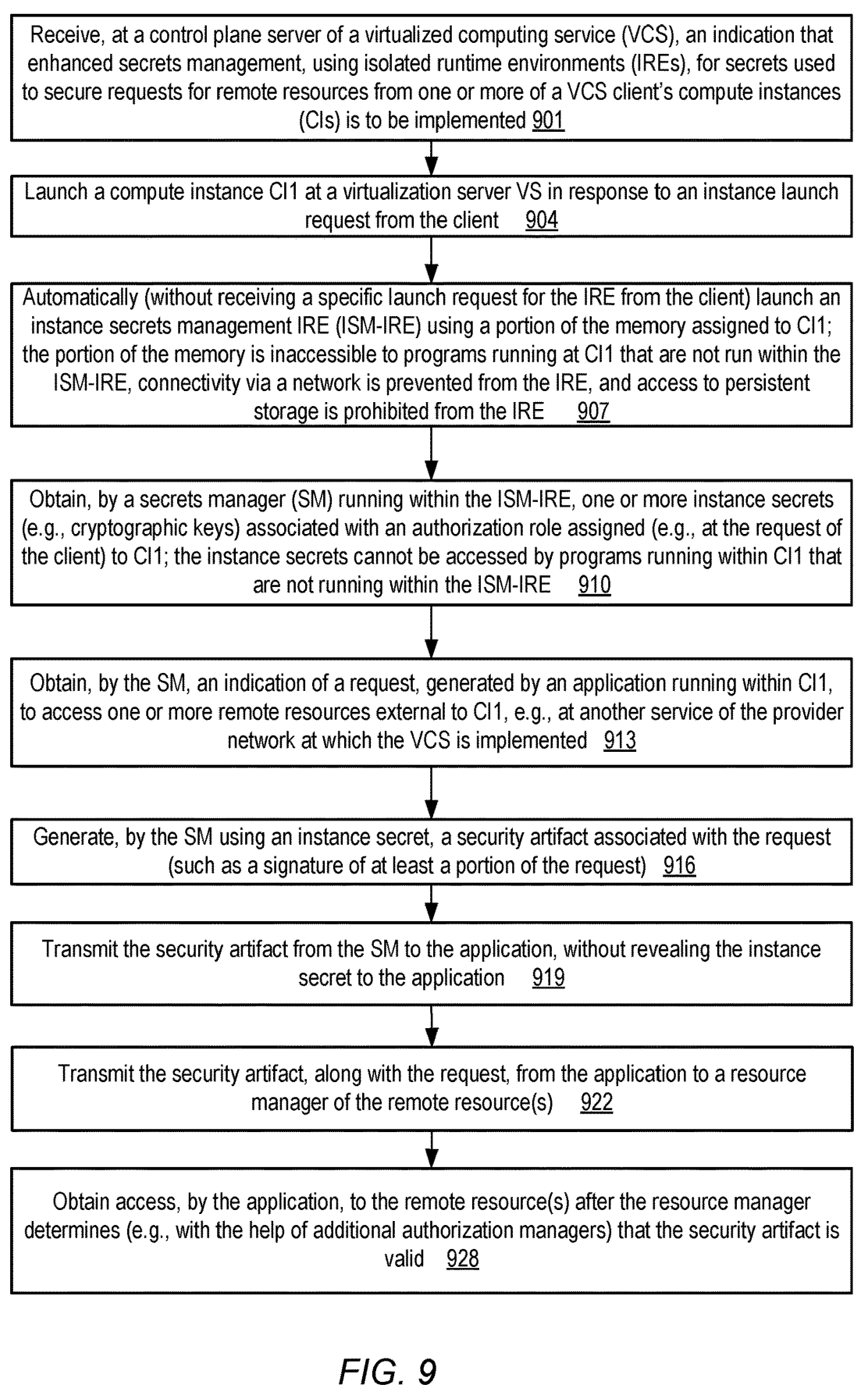

Receive, at a control plane server of a virtualized computing service (VCS), an indication that enhanced secrets management, using isolated runtime environments (IREs), for secrets used to secure requests for remote resources from one or more of a VCS client's compute instances (CIs) is to be implemented 901

Launch a compute instance CI1 at a virtualization server VS in response to an instance launch request from the client    904

Automatically (without receiving a specific launch request for the IRE from the client) launch an instance secrets management IRE (ISM-IRE) using a portion of the memory assigned to CI1; the portion of the memory is inaccessible to programs running at CI1 that are not run within the ISM-IRE, connectivity via a network is prevented from the IRE, and access to persistent storage is prohibited from the IRE    907

Obtain, by a secrets manager (SM) running within the ISM-IRE, one or more instance secrets (e.g., cryptographic keys) associated with an authorization role assigned (e.g., at the request of the client) to CI1; the instance secrets cannot be accessed by programs running within CI1 that are not running within the ISM-IRE    910

Obtain, by the SM, an indication of a request, generated by an application running within CI1, to access one or more remote resources external to CI1, e.g., at another service of the provider network at which the VCS is implemented    913

Generate, by the SM using an instance secret, a security artifact associated with the request (such as a signature of at least a portion of the request)    916

Transmit the security artifact from the SM to the application, without revealing the instance secret to the application    919

Transmit the security artifact, along with the request, from the application to a resource manager of the remote resource(s)    922

Obtain access, by the application, to the remote resource(s) after the resource manager determines (e.g., with the help of additional authorization managers) that the security artifact is valid    928

*FIG. 9*

ISOLATED RUNTIME ENVIRONMENTS FOR SECURING SECRETS USED TO ACCESS REMOTE RESOURCES FROM COMPUTE INSTANCES

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines. In cloud-based computing environments, programs running within a given virtual machine or compute instance of a virtualized computing service may need to access remote resources at other services, and the requests to access the remote resources may need to be secured.

BRIEF DESCRIPTION OF DRAWINGS

FIG. 2 illustrates an example remote request submission protocol that may be employed at a cloud provider network, according to at least some embodiments.

FIG. 7 illustrates an example scenario in which multiple isolated runtime environments may be established within a compute instance, according to at least some embodiments.

FIG. 9 is a flow diagram illustrating aspects of operations which may be performed to use isolated runtime environments to manage instance secrets, according to at least some embodiments.

Figure 1:
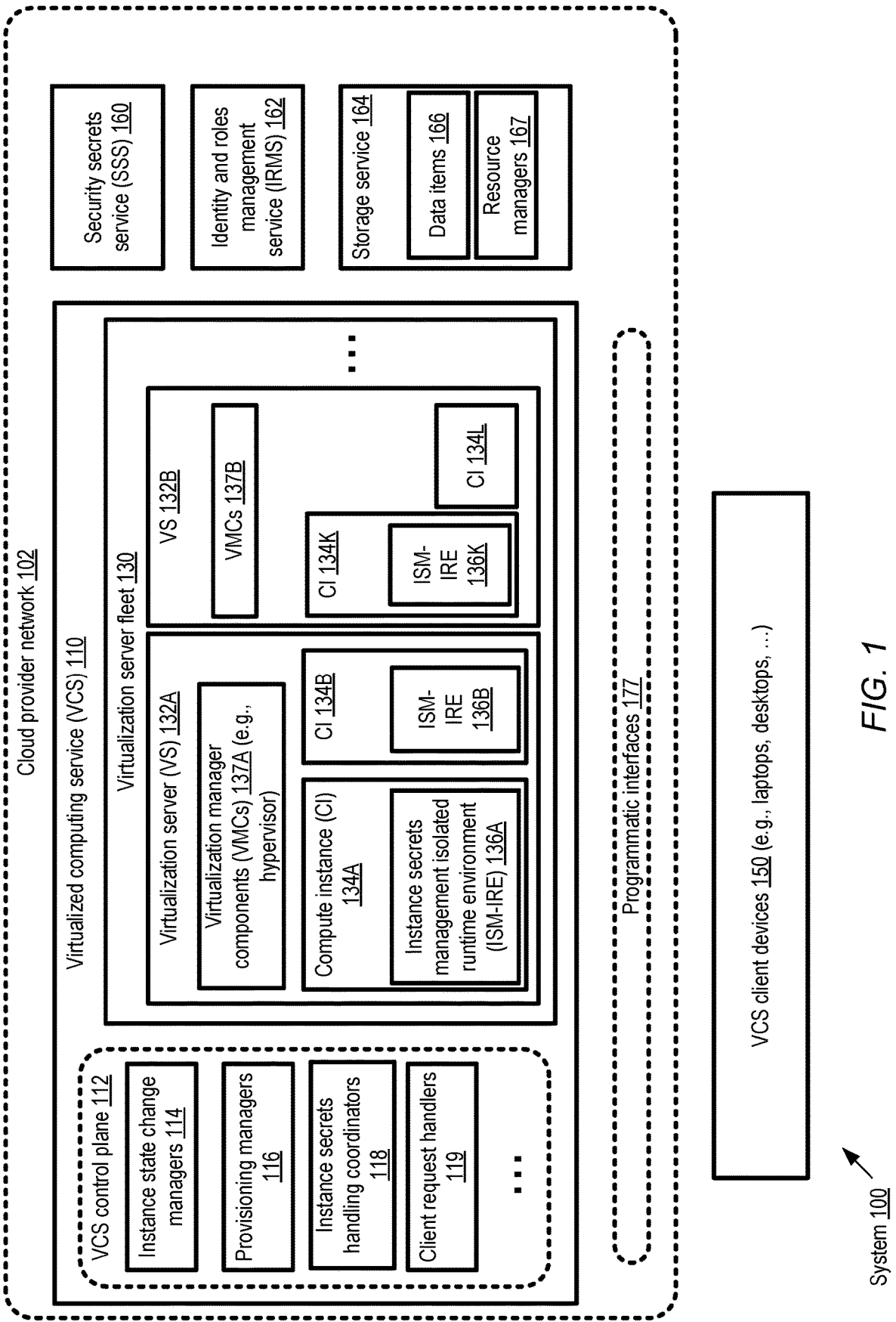
FIG. 1 illustrates an example system environment in which automatically launched isolated runtime environments may be utilized to enhance the security of secrets utilized for accessing remote resources from compute instances at a virtualized computing service of a cloud provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for reducing the probability of misuse of security secrets associated with compute instances of virtualized computing services, using isolated runtime environments. Typically, credentials/security secrets are accessible to all of the software and users of an instance which uses the credentials to obtain access to other resources, which can increase the probability of misuse of the credentials. Specifically, the present disclosure relates to a "credential-less" authentication protocol for compute instances, which refers to an authentication protocol by which the security secrets used by an instance for authentication are never directly exposed to the instance itself. The security secrets, such as unique cryptographic keys assigned to the compute instances, can be utilized for preparing requests to access remote resources within a cloud provider network (e.g., remote resources managed at services other than the virtualized computing service) from the compute instances. In order to securely access a remote resource such as a data item stored at a storage service of the provider network from a program running at a compute instance, a programmatic request (such as a HyperText Transfer Protocol (HTTP) GET request) for the remote resource is formatted and digitally signed according to a protocol enforced by the provider network. An authorization role is assigned, e.g., at the request of the virtualized computing service (VCS) client for whom the compute instance is established, to the compute instance, enabling programs running within the compute instance to access or utilize remote resources or services indicated in the role. One or more security secrets, generated for the compute instance based on the authorization role and referred to herein as "instance secrets," are used in the process of preparing the programmatic request for transmission to the service where the remote resource is managed.

In order to support various types of secure computations, including the signing of requests for remote resources using instance secrets, isolated runtime environments with verified software configurations can be established within compute instances. Such isolated runtime environments (IREs) can be referred to as "software enclaves". The compute instance with which an IRE is associated, and which can utilize the IRE for secure computations, is referred to as the "parent" compute instance of the IRE. An IRE can utilize a segregated subset of the memory assigned to its parent compute instance; other programs running within the compute instance (i.e., programs that are not running within the IRE itself) cannot access the segregated subset of the memory. Programs within the IRE can only communicate with external entities via a special local communication channel and a communication intermediary running at the compute instance, and are prohibited from accessing persistent storage or establishing network connections. Security secrets for various applications can be obtained at or provided to trusted programs running within an IRE using the local communication channel, without exposing the secrets to less-trusted programs of the compute instance which are not running within the IRE. Such secrets can later be used to perform computations by the trusted programs within the IRE, for example at the request of the less-trusted programs.

In general, IREs can be established for various purposes, e.g., at the request of the client on whose behalf the parent compute instance is run, or at the request of the control plane or administrative components of the VCS. An IRE configured as an instance secrets management IRE or ISM-IRE can be automatically established for a parent compute instance for the purpose of managing instance secrets, e.g., after the VCS client on whose behalf the parent compute instance is established opts in to (or does not opt out from) the use of ISM-IREs for preparing requests for remote resources. For example, a control plane server of the VCS can cause an ISM-IRE comprising a secrets manager (e.g., one or more processes or threads) to be launched for a parent compute instance by issuing a command to a virtualization management component (VMC) running at the virtualization host at which the compute instance runs. In some cases, depending for example on the machine image being used for the compute instance, the ISM-IRE can be launched as part of the overall launch procedure of the parent compute instance. The establishment of the ISM-IRE can be referred to as being automatic in that an explicit request to launch the ISM-IRE itself is not required from the VCS client. Furthermore, a set of one or more instance secrets (such as private cryptographic keys) of the parent compute instance can be obtained or determined automatically by the secrets manager, e.g., from a security service of the provider network, without requiring the VCS client to request the acquisition of the instance secrets.

Applications running within the parent compute instance can then send representations of their access requests for remote resources to the secrets manager. The secrets manager can use the instance secret(s) to generate a respective signature (or other similar security artifacts) for the remote resource access requests, and provide the signatures or artifacts to the applications by which the remote resources are to be accessed. The applications can send the security artifacts, along with the requests, to the services at which the requested resources are managed in accordance with the remote access protocols of the provider network, without the applications ever having access to the instance secrets. Resource managers or request handlers at the remote services can provide access to the resources if the security artifacts are determined to be valid, e.g., if an authorization role assigned to the compute instance and associated with the instance secrets permits or grants the compute instance access to the resources. At the virtualization server at which the parent compute instance runs, the instance secrets cannot be saved or stored at locations outside the ISM-IRE; nor can the instance secrets be transmitted via networks to any other entities. As such, the use of the ISM-IRE can substantially reduce the probability of inadvertent or deliberate compromise or "leakage" of the instance secrets, As one skilled in the art will appreciate in light of this disclosure, certain embodiments may be capable of achieving various advantages, including some or all of the following: (a) eliminating, or at least substantially reducing the probability of, inadvertent or deliberate misuse of security secrets that are used for accessing remote resources from compute instances implemented at a provider network, even if a malicious entity were somehow to gain access to, or run programs at, the compute instance and/or (b) reducing the amount of computing and other resources that may otherwise have to be dedicated to detecting and debugging unauthorized accesses to resources at a provider network.

According to some embodiments, a system may include one or more control plane servers (CPSs) of a virtualized computing service (VCS) of a cloud provider network, one or more virtualization servers or hosts of the VCS, and one or more resource managers of a collection of resources at another service (such as a storage service or a database service) of the provider network. A CPS may cause an instance secrets management isolated runtime environment (ISM-IRE) comprising a secrets manager (SM) to be launched automatically within a compute instance run at a virtualization server. The ISM-IRE may be granted access to a subset of memory assigned to the compute instance. The ISM-IRE may be launched without receiving a specific launch request for the ISM-IRE from a client of the VCS for whom a request to launch the compute instance may have been received at the VCS control plane. The subset of memory may be inaccessible from programs running outside the ISM-IRE in various embodiments. Network communication with endpoints outside the virtualization server may be prohibited from the ISM-IRE. For example, the ISM-IRE may be configured in with no external networking (networking outside of the local host on which it is launched) and may only be configured with a secure local channel for communication with the parent instance, which may be a local socket such as a VM Socket (vsock) in some implementations. An ISM-IRE may also be configured with no persistent storage, remote storage, nor interactive access. Even a root user or an admin user on the parent instance will not be able to access or SSH into the ISM-IRE. In some embodiments, the ISM-IRE may be launched as part of the initialization or boot procedure of the compute instance using a particular machine image provided to virtualization management components (VMCs) of the virtualization server, e.g., from the control plane servers. In other embodiments, the ISM-IRE may be launched at some point after the compute instance is launched.

The SM (secrets manager) may be configured to automatically determine or obtain, e.g., from a security service of the provider network, a set of one or more instance secrets (such as a cryptographic key) associated with an authorization role assigned to the compute instance, without receiving a request from the client to determine/obtain the instance secrets in some embodiments. The instance secrets may not be accessible by programs that are (a) running within the compute instance and (b) not running within the ISM-IRE itself in at least one embodiment The SM may obtain an indication of a request, generated by an application running within the compute instance, to access a resource of the collection of resources (which are managed by the resource manager) of the other service in various embodiments. The SM may provide, to the application, a set of one or more security artifacts, such as a digital signature of at least a portion of the resource access request. The set of security artifacts may be generated by the SM using at least the instance secrets. The application may transmit the request, along with the security artifacts provided by the SM, to a resource manager of the to-be-accessed resource. The resource manager may provide the application access to the resource in response to a determination that the security artifacts are valid and that the role assigned to the compute instance (which may be indicated by the security artifacts, or obtained by the resource manager using a different mechanism) permits access to the resource in various embodiments.

In at least one embodiment, before the ISM-IRE is used for requests generated at the compute instance, the VCS client at whose request the parent compute instance of the ISM-IRE is launched may submit a programmatic request to the VCS control plane indicating the authorization role to be assigned to the parent compute instance. Such role assignment requests may be submitted using any of a variety of programmatic interfaces of the VCS in various embodiments, such as a web-based console, command-line tools, graphical user interfaces, application programming interfaces (APIs) or the like. In one embodiment, the instance launch request which results in the establishment of the parent compute instance may include the role as a parameter. A set of instance secrets may be associated with (or generated using) the role in various embodiments.

In some embodiments, multiple roles may be assigned to a given compute instance at the request of a VCS client, and respective sets of instance secrets may be generated for each such role. Multiple roles may be used, for example, to enable respective subsets of applications running at the parent compute instance to access respective sets of remote resources. Information about the role to be used for a given resource access request may be provided by an application to the secrets manager (SM) in some embodiments, and used by the SM to select which instance secrets are to be used for generating the signature or security artifacts for the given resource access request.

According to one embodiment, the VCS may support multiple options for handling instance secrets. One of the options may involve the establishment of ISM-IREs and secrets managers of the kind introduced above; another option may for example involve the acquisition of instance secrets from a metadata service running at the virtualization server. VCS clients that wish to use the metadata service may inform the VCS control plane servers via programmatic interfaces accordingly in some embodiments. If a VCS client decides to use the metadata service for a particular compute instance or all the client's compute instances, ISM-IREs may not be set up for those compute instances. In at least some embodiments, the VCS control plane may obtain an indication that a client has opted in (or not opted out) of the ISM-IRE option, and set up respective ISM-IREs for that client's compute instances only after the client's approval of the use of ISM-IREs.

In some embodiments, to further enhance the security of instance secrets, the validity of a given instance secret may expire automatically after a time, and the SM may therefore have to acquire newer versions of the secrets from time to time. In one embodiment, the VCS client may provide, via a programmatic interface, an indication of an expiration criterion for one or more instance secrets managed by the SM. The expiration criterion may for example be specified as a time interval (e.g., the equivalent of "an instance secret is to expire T minutes after it is generated"), specified based on usage (e.g., "an instance secret is to expire after it has been used for N resource access requests"), a combination of time and usage ("an instance secret is to remain valid for at most N resource access requests, and is to expire no later than T minutes after the secret is generated"), or using other factors. After (or shortly before) a given secret expires, the SM may obtain a replacement for that secret in various embodiments, and use the replacement version going forward.

Validity of the software (and/or hardware) state of at least a portion of the virtualization server at which an ISM-IRE is launched may be verified before an instance secret is generated for a compute instance running at the virtualization server in some embodiments. For example, an attestation document indicative of the state of the software (including the virtualization management components software, the ISM-IRE software including the SM etc.) may be provided to a security service of the provider network which is responsible for generating instance secrets, and the security service may ensure that the state information provided to it is acceptable or valid before issuing the instance secret or providing the instance secret to the SM.

In some embodiments, at least some instance secrets may be obtained by the SM during the boot or launch procedure of the ISM-IRE, e.g., in advance of any resource access requests from applications running at the parent compute instance of the ISM-IRE. In other embodiments, an instance secret may be acquired the first time it is needed, e.g., in response to an indication obtained at the SM that of a resource access request from an application running at the parent compute instance.

Access to any of a variety of resources at the cloud provider network, or to resources external to the cloud provider network, may be secured using instance secrets in some embodiments. Such resources may for example include data items stored at storage services (such as an object storage service, a file system service, or the like), data items stored at database services, machine learning models stored at machine learning services, and so on. In one embodiment, instance secrets may be needed to access resources at a client premise from a compute instance which is running at a data center of the provider network. For example, a resource manager of such a client-premise resource may invoke an authorization service (e.g., an authorization service within the provider network) to determine whether the security artifacts submitted along with a request from the compute instance are valid, and provide access to the resource after the security artifacts are determined to be acceptable.

In at least one embodiment, multiple IREs (including at least one ISM-IRE) may be established for a given parent compute instance. For example, while the VCS control plane automatically causes the establishment of the ISM-IRE, the client on whose behalf the parent compute instance is set up may request the establishment of other IREs that can be used to perform security operations unrelated to the use of instance secrets. Each IRE, including such a client-requested IRE, may comprise its own secrets manager in such embodiments, and client-requested IREs may be restricted to using a local communication channel of the same kind as the channel used by the ISM-IRE. In some implementations, such local channels may utilize one or more shared memory buffers and/or an interrupt-driven communication protocol. Security secrets used by the secrets manager of a client-requested IRE may be obtained from a source indicated by the VCS client, and used by the secrets managers to perform computations and/or generate security artifacts based on the client's application requirements. The ISM-IRE may be referred to as a system-generated IRE, as opposed to client-requested IREs in such embodiments.

As indicated above, the VCS may be implemented as part of a suite of services of a cloud provider network or cloud computing environment in various embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, virtualization servers may be located within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Some edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to a VCS, data processing service(s) (e.g., map reduce, data flow, and/or other large scale data processing techniques), data storage services (e.g., object storage services, block-based storage services, or data warehouse storage services), other kinds of packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service or VCS (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). In some embodiments, one or more of the instance types may support the automatic establishment of ISM-IREs of the kind introduced above. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network including the VCS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes nonadministrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which automatically launched isolated runtime environments may be utilized to enhance the security of secrets utilized for accessing remote resources from compute instances at a virtualized computing service of a cloud provider network, according to at least some embodiments. As shown, system 100 comprises resources and artifacts of several network-accessible services of a cloud provider network 102, including a virtualized computing service (VCS) 110, a security secrets service 160, an identity and roles management service (IRMS) and a storage service 164. The VCS control plane 112 may comprise a plurality of control plane servers, including for example instance state change managers 114, provisioning managers 116, instance secrets handling coordinators 118, client request handlers 119, and so on. The VCS may include virtualization server fleet 130, comprising virtualization servers (VSs) 132A and 132B at which various types of compute instances or virtual machines may be launched in response to programmatic requests from VCS clients. A given virtualization server 132 may comprise virtualization manager components (VMCs) 137 (such as hypervisors), and zero or more compute instances at a given point in time. For example, VS 132A comprises VMCs 137A and compute instances (CIs) 134A and 134B, while VS 132B comprises VMCs 137B and CIs 134K and 134L.

Some of the compute instances may include application programs that need to access resources at other services of the provider network, such as data items 166 of storage service 164. To help ensure that only authorized entities can access the data items 166, a protocol for submitting resource access requests from compute instances 134 may be employed and enforced at the provider network 102 in the depicted embodiment. An example of such a protocol is described below in the context in FIG. 2. As part of such a protocol, security artifacts (such as digital signatures of at least a portion of a formatted string representing a resource access request) may be generated using instance secrets assigned to the compute instance at which the compute instance originates. The SSS 160 may be responsible for generating the instance secrets in at least some embodiments. The security artifacts may be transmitted along with the resource access request to resource managers 167 responsible for the data items being accessed, and access to the data items may only be provided by the resource managers after the security artifacts are verified as being valid in the depicted embodiment. A given compute instance 134 may be assigned one or more authorization roles (also referred to as access management roles) at the request of a VCS client on whose behalf the compute instance is launched. A given role may include rules indicating the kinds of (or specific lists of) remote resources that can be accessed from the compute instance in various embodiments, and the instance secrets may be generated based at least in part on the role. Information about the roles may be stored at IRMS 162 in the depicted embodiment.

In the embodiment depicted in FIG. 1, one or more control plane servers (such as instance secrets handling coordinators 118 and/or instance state change managers 114) may cause a respective instance secrets management isolated runtime environment (ISM-IRE) to be launched automatically within (e.g., using a segregated portion of memory of) at least some compute instances. For example, CI 134A includes ISM-IRE 136A, CI 134B includes ISM-IRE 136B, and CI 134K includes ISM-IRE 136K. Some CIs, such as CI 134L, may not include ISM-IREs in the depicted embodiment. While the CIs themselves may be launched in response to programmatic requests of VCS clients, the ISM-IREs may be launched without receiving specific client requests for doing so in at least some embodiments. Communication to/from the ISM-IRES may be severely restricted in various embodiments—for example, no network communication may be allowed, input/output to persistent storage may be prohibited, and so on. A local communication channel, e.g., using shared memory buffers, may be set up for messages originating at or directed to the ISM-IRE. Each ISM-IRE may comprise a respective secrets manager, implemented for example using one or more processes or threads. In some embodiments, the VCS control plane may only launch an ISM-IRE at a client's CI in response to an indication that the client has opted in to the use of ISM-IREs. In other embodiments, the use of ISM-IREs may be the default option provided to VCS clients, and an ISM-IRE may be automatically created for each CI unless the client opts out of the default.

The secrets manager of an ISM-IRE of may acquire, determine or obtain a set of instance secrets associated with a role assigned to its parent compute instance (the compute instance within which the ISM-IRE is set up). For example, a highly secure communication pathway may be established between the ISM-IRE (using the local communication channel) and the SSS 160 to obtain the instance secrets. In response to receiving an indication of a resource access request (e.g., an access request directed to a data item 166 of storage service 164) originating at an application running within the parent CI, the SM may generate security artifact(s) for the request (e.g., a digital signature corresponding to at least a portion of the request) using an appropriate instance secret, and provide the security artifact(s) to the application. The application may then transmit the security artifacts along with the request to a resource manager 167. After the security artifact is validated/verified (e.g., either by the resource manager itself, or by an authentication/authorization service invoked by the resource manager) and the resource manager ascertains that the compute instance is allowed (e.g., based on the role assigned to the compute instance) to access the targeted resource, access to the resource may be granted in the depicted embodiment. If the security artifact is found to be unacceptable or invalid, or if the associated role does not permit access to the targeted resource, access to the targeted resource may be denied in various embodiments.

In some embodiments, a given CI may be assigned multiple authorization roles (each enabling an application to access different sets of resources), respective sets of instance secrets may be generated corresponding to each role, and each set of instance secrets may be used in the manner described above to enable resource access according to the corresponding roles. In some embodiments, in addition to the automatic or system-launched ISM-IREs, other IREs may be launched at a parent CI at the explicit request of the VCS client, and used for other security computations or operations that do not necessarily require instance secrets. In one embodiment, the VCS clients may provide input to the VCS control plane regarding expiration criteria for the instance secrets of one or more of their CIs, forcing the SMs to refresh or replace instance secrets based on the expiration criteria. According to some embodiments, the state of at least some of the installed software of the virtualization server may be verified, e.g., using attestation documents prepared by VMCs, before an instance secret is provided to an SM running at an ISM-IRE of the virtualization server. In one embodiment, at least some instance secrets may be obtained by an SM at (or very shortly after) the time that the parent CI and the ISM-IRE start up; in other embodiments, some or all instance secrets may be acquired only in response to detecting that a request to access a remote resource has been generated by an application running at the parent CI.

The VCS 110 may implement one or more programmatic interfaces 177, including for example one or more web-based consoles, a collection of application programming interfaces (APIs), command line tools, graphical user interfaces and the like. Such interfaces may be utilized by VCS clients to request various types of configuration operations from a variety of VCS client devices 150 (e.g., desktops, laptops, mobile computing devices and the like) and to receive corresponding responses and the like. For example, clients may submit programmatic requests to launch or instantiate compute instances (CIs) 134, opt in or opt out of the use of ISM-IREs, submit preferences regarding expiration criteria of instance secrets, and so on. Individual ones of the compute instances 134 may comprise respective virtual machines and/or other types of program execution platforms (such as bare-metal instances with direct control granted to more hardware devices than is granted to guest virtual machines) in various embodiments.

In some embodiments, at least some of the client requests may be directed to the VCS control plane 112. Control plane servers such as instance state change managers 114, provisioning managers 116, instance secrets handling coordinators 118, and client request handlers 119, may respectively be implemented using some combination of hardware and software at one or more computing devices in the depicted embodiment. A client's request for a compute instance may, for example, be processed initially at a request handler 119. The request handler may perform some initial checking (e.g., to verify that the client has permissions for the kinds of operations being requested), and then pass on internal versions of the request to one or more other components of the control plane for implementation. Instance state change managers may be responsible, for example, for launching, terminating and migrating compute instances implemented at virtualization servers of virtualization server fleet 130 of the VCS in the depicted embodiment. The provisioning managers 116 may, for example, be responsible for identifying a specific virtualization server at which one or more requested compute instances are to be launched in the depicted embodiment.

The virtualization manager components (VMCs) 137 (which may include a hypervisor) at virtualization servers may act as intermediaries between the compute instances 134 and at least some of the hardware elements of the VSs, including for example physical processors (e.g., central processing units (CPUs), graphical processing units (GPUs), etc.), memory, persistent storage devices, networking cards, peripheral devices and the like. In some embodiments, at least a portion of virtualization management responsibilities may be offloaded from the primary processors or CPUs to a hardware card (e.g., a card linked to the CPUs of the VS via a Peripheral Connect Interface or PCI-Express interconnect, and referred to as an offloading card) in order to free up more of the computing capacity of the primary processors for compute instances.

After a request to launch a compute instance is sent by a client to the VCS control plane, a corresponding internal command to launch the instance may be transmitted to a virtualization manager component (e.g., a hypervisor or an offloaded virtualization management component) running at a selected virtualization server in the depicted embodiment. A set of resources, including a section of the virtualization server's memory, may be allocated to the compute instance by the virtualization manager component. In some embodiments, a control plane server may send a request to the VMC to launch an ISM-IRE, e.g., as part of the internal command that results in the launch of the CI itself. In other embodiments, a separate request and/or command may be transmitted to the virtualization server to launch the ISM-IRE, e.g., after a compute instance 134 has already been set up. At least a portion of the memory allocated to the compute instance may be segregated or set aside for an ISM-IRE 136 by a VMC 137 in some embodiments. As indicated in FIG. 1, resources of a given virtualization server 132 (such as 132A and 132B) may be used for multiple compute instances in at least some embodiments, some of which may be set on behalf of different VCS clients. Other virtualization servers may comprise one or more compute instances set up on behalf of a single client. Respective subsets of resources allocated to a given compute instance may be segregated or carved out for multiple IREs in some scenarios (e.g., including an ISM-IRE and one or more client-requested IREs). In at least some embodiments, the lifetimes of client-requested IREs and their parent compute instances (or other client-requested IREs at the same compute instance) may differ—e.g., it may be the case that one client-requested IRE is terminated before its parent CI, or that one client-requested IRE is terminated before another client-requested IRE with the same parent CI. In some embodiments, an ISM-IRE may only be terminated when its parent CI terminates. The resources of the parent compute instance that are segregated or set aside for an IRE may not be accessible to programs or processes running at the parent compute instance in at least some embodiments—for example, if 4 gigabytes of a total of 32 gigabytes of memory that was originally allocated to a CI is set aside for an ISM-IRE, programs/processes within the CI may only be able to access and use the remaining 28 gigabytes.

When configuring or instantiating an IRE, as mentioned above, in various embodiments a number of constraints may be enforced to limit the manner in which programs or processes within the IRE can communicate or interact with other entities (e.g., processes/programs running in the parent compute instance, or outside the parent compute instance). In at least one embodiment, for example, an IRE process/program may be prohibited from over-the-wire networking communications with any entities outside the IRE (e.g., by not configuring virtual or physical network interfaces accessible the IRE). Similarly, in various embodiments, IREs may be configured such that access to persistent storage devices and/or file systems is prohibited—that is, processes/programs within an IRE may not be able to perform reads or writes to persistent storage. In some embodiments, one or more communication intermediary processes (CIPs) or daemons may be instantiated in the parent compute instance of an IRE, which are permitted to use a local communication channel to communicate with the IRE on behalf of other processes/programs inside or outside the parent compute instance. For example, in some embodiments one or more buffers of shared memory, mapped to both a CIP and an IRE, may be used for such communications. In at least some such embodiments, an interrupt-based or notification-based communication technique may be used for bidirectional communications between a CIP and an IRE—e.g., a notification may be generated by the CIP when a message is ready for the IRE, and similar notifications may be used to indicate when the IRE has finished reading the buffers, when the IRE has an outbound message ready in a buffer, when the CIP has finished transmitting that outbound message, and so on. In some embodiments, such a communication mechanism may be referred to as a "doorbell" mechanism.

In at least some embodiments, a VMC of a VS 132, such as a hypervisor, may comprise a security manager responsible for verifying or measuring the software configuration of an IRE 136 and/or other software components of the VS, including at least some portions of the VMC itself. The security manager may perform measurements and/or an attestation of the software stack of the IRE and other software components, and the results of such configuration verification or analysis operations may be provided to one or more destinations (e.g., to an SSS 160) in various embodiments. In at least one embodiment, one or more hash functions may be applied to the installed software by the security manager, and a result of the hash functions may be compared with hash results of acceptable configurations by the client. Evidence that the security manager itself can be trusted (such as a digital certificate identifying the security manager), as well as a unique identifier of the IRE and/or its parent compute instance may also be provided in at least some embodiments.

In embodiments in which the SSS 160 generates the instance secrets, a mechanism that does not allow unencrypted versions of the instance secrets to be intercepted or accessed by any parties other than the SSS and the ISM-IRE itself may be employed. In some embodiments, for example, the logical equivalent of a TLS (Transport Layer Security) session may be set up between the SSS and the IRE, and the instance secrets may be encrypted using a shared secret key determined/generated by both the ISM-IRE and the SSS during the session. Note that even though the encrypted version of a secret may pass through the communication intermediary process (CIP) on its way to the ISM-IRE from the client, the CIP may not have the shared secret key needed to decrypt the secret in various embodiments. The decrypted version of the secret may be generated within the IRE using the shared secret key in at least some embodiments.

FIG. 2 illustrates an example remote request submission protocol that may be employed at a cloud provider network, according to at least some embodiments. In the depicted scenario, an application program 236 running at a compute instance (CI) 234, configured at the request of a client Client1 of a VCS similar to VCS 110 of FIG. 1, needs to access a data item 266 at a storage service 264. The storage service may for example implement web services interfaces that can be used to request access via HTTP or a similar protocol.

A remote request submission protocol of the cloud provider network at which the VCS and the storage service are implemented may involve several steps in the depicted embodiment. In the first step, labeled Step A in FIG. 2, a canonical or standardized request for the data item, such as an appropriately structured version of an HTTP GET or PUT request, may be created. Elements of the request, including for example the HTTP request method, the targeted service name or service host name expressed as a URI (uniform resource identifier), a query string, various HTTP headers and the like may have to be arranged in a particular sequence, with specified delimiters (such as newline tokens) separating respective elements of request. In Step B, a string to sign may be created from the canonical request. The string may include, for example, an identifier of the hashing algorithm used for generating digests of the canonical request, a representation of the data and time at which the request is generated, a representation of a credential scope associated with the request (e.g., the region of the provider network, s name of the targeted service, etc.), and a hashed representation of the canonical request itself.

In Step C, a digital signature for the request may be generated or computed. As part of the process of generating the signature, a signing key may be created using an instance secret of the CI. A series of hash-based message authentication codes (HMACs) may be generated in some embodiments to eventually obtain the signing key. The signing key and the string to sign (generated in Step B) may be provided as input to a keyed hash function, and the output of the keyed hash function may represent the signature. The instance secret itself may be generated (e.g., at a security secrets service of the provider network) based at least in part on an authorization role assigned to the CI by Client1 in some embodiments. In one embodiment, other security data, such as a session token and/or a key identifier assigned to the client's account at the provider network may also be used in the process of generating the signature. The key identifier may indicate or identify an authorization role (assigned to the CI) for which the instance secret is created in some implementations.

In Step D, the signature and the request may be sent to the target storage service 264 at which the data item resides. If the signature is valid and accepted, access to the data item may be provided to the requesting application in Step E; if the signature is not valid, access may be denied in at least some embodiments.

The protocol 277 may not necessarily place any strict requirements on exactly how or by which entities/programs the signature is computed in some embodiments, or how/ where the secret key is stored. For example, Steps A, B and C may be performed within a software development kit (SDK) provided by the provider network operator and used by the application to access external data, within a command-line tool or other tools provided by the provider network operator, or within program code developed by the client. If the client does not wish to utilize the ISM-IRE based technique described above, the secret key may be stored in plain text on the CI, hard-coded into the application 236, read in from a file by the application, or handled in any other way chosen by the client. However, security of the secret key may be considerably enhanced in various embodiments by utilizing an ISM-IRE, which can ensure that the secret key cannot be accessed by any programs running outside the ISM-IRE, including the application program 236 itself.

Figure 3:
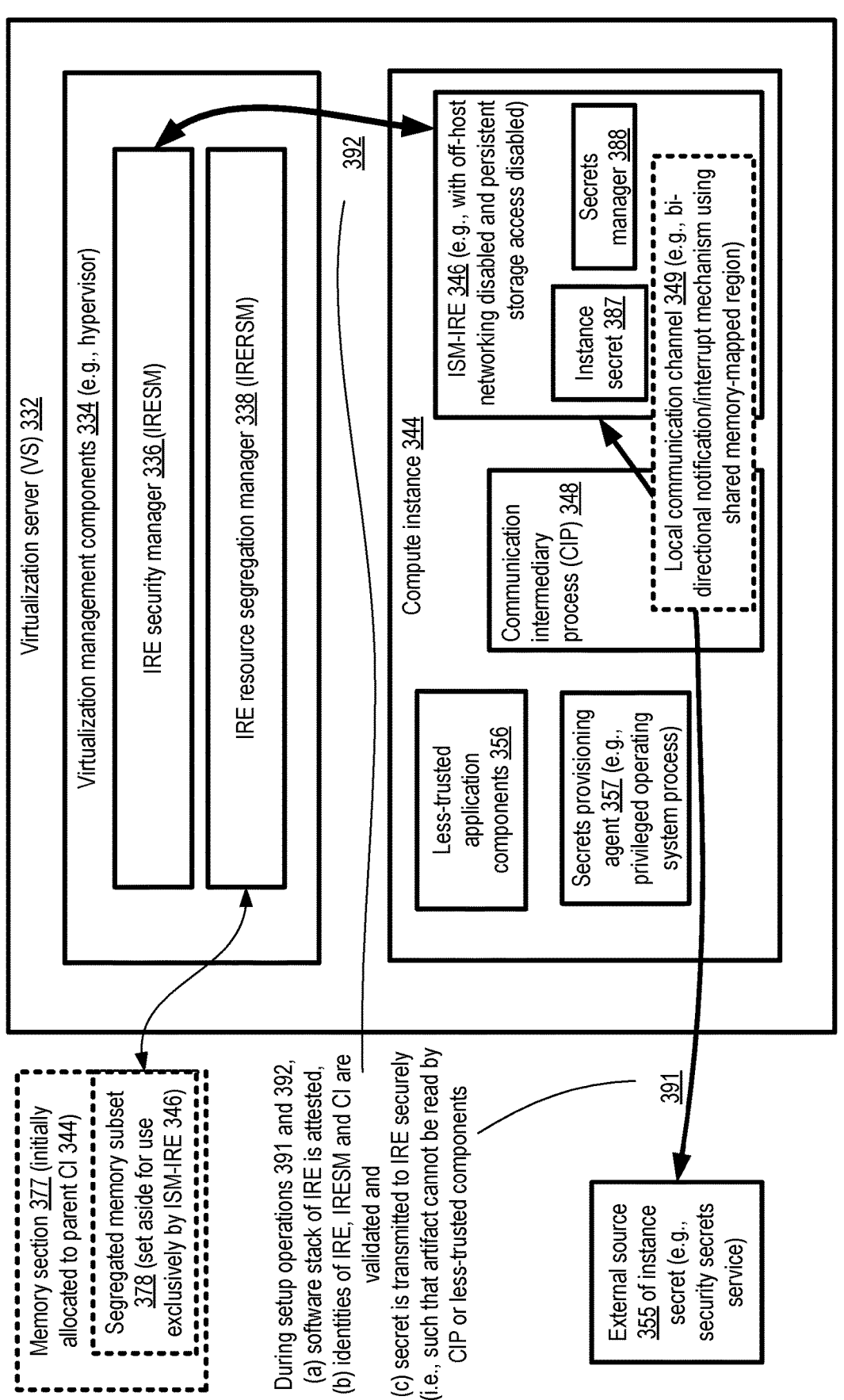
FIG. 3 illustrates components of a virtualization server at which an instance secrets management isolated runtime environment may be launched, according to at least some embodiments.

FIG. 3 illustrates components of a virtualization server at which an instance secrets management isolated runtime environment may be launched, according to at least some embodiments. In the depicted embodiment, a compute instance 344 may be launched at a virtualization server 332 of a VCS, e.g., in response to a request submitted by a VCS client. An ISM-IRE 346 may be set up automatically in various embodiments with compute instance 344 as the parent compute instance, using some of the resources that were earlier allocated to the compute instance 344. Virtualization management components 334 of the virtualization server 332 may include an IRE resource segregation manager (IRERSM) 338 responsible for identifying resources to be configured for exclusive use by the ISM-IRE (by threads or processes launched within the ISM-IRE) in at least some embodiments. For example, from the memory section 377 of the virtualization server which was initially allocated to the parent compute instance 344, the IRERSM 338 may select or identify a memory subset 378 for exclusive use by the ISM-IRE; as and when additional client-requested IREs or system-requested IREs are set up within the same parent CI, the IRERSM 338 may set aside respective additional subsets exclusively for such IREs. The segregated memory may not be accessible to processes/programs running within the parent CI after it has been configured for ISM-IRE use in such embodiments. A subset of other resources, such as virtual CPUs that may have been designated for use by the parent compute instance 344, may also be designated for exclusive use by the ISM-IRE in some embodiments.

Within the compute instance 344, a communication intermediary process (CIP) 348 may be instantiated in various embodiments. An operating system daemon may be used as the CIP in some embodiments. In one embodiment, such a CIP daemon may be established as part of the procedure of establishing the ISM-IRE 346; in other embodiments, the CIP daemon may be started up as part of the initialization or boot sequence of the parent compute instance 344, or in response to invocation of an API after the compute instance has booted. The CIP 348 may be configured to transfer data to the ISM-IRE 346 from any other entities that wish to communicate with the ISM-IRE (e.g., including an external source 355 of instance secrets, such as a security secrets service similar to SSS 160 of FIG. 1), and to transfer outbound data from the ISM-IRE 346 to one or more destinations in various embodiments. As part of the configuration steps to ensure the isolation of the ISM-IRE from any external entities (e.g., other than the VMC 334), processes/programs of the ISM-IRE 346 may not be permitted to transfer data to any entity or endpoint over a network connection that uses a network interface card of the virtualization server in at least some embodiments; all communications to/from the ISM-IRE may have to pass through the CIP in such embodiments. Similarly, in some embodiments configuration settings of the ISM-IRE 346 may also prohibit interactions between the IRE and persistent storage, and between the ISM-IRE 346 and a file system in such embodiments—that is, reads from and writes to persistent storage may not be permitted from processes/programs of the ISM-IRE. A local communication channel 349 may be set up for data transfers between the CIP and the ISM-IRE in at least some embodiments. For example, a portion of shared memory which is accessible to both the CIP and the ISM-IRE may be designated or mapped to store data being transferred in/out of the ISM-IRE in one embodiment. A bi-directional notification or interrupt-based mechanism may be used to indicate when data is ready to be read by the ISM-IRE (for data inbound to the ISM-IRE) or read by the CIP (for data outbound from the ISM-IRE) in some embodiments. The compute instance 344 may comprise various other processes/programs such as application components 356 and/or operating system components of the compute instance, which may be less trusted (from the perspective of the VCS control plane and/or the VCS client) than the ISM-IRE with respect to performing computations using security secrets in the depicted embodiment.

In at least some embodiments, a configuration verification operation may be performed with respect to the ISM-IRE at one or more points in time during the lifetime of the ISM-IRE. A configuration verification query may be transmitted to the CIP 348 from a verification requester (e.g., a control plane server such as an instance secrets handling coordinator 118 of FIG. 1), which may in turn pass on the query to the ISM-IRE. An IRE security manager (IRESM) 336 may determine that the query has been directed to the ISM-IRE 346, e.g., based on an indication provided by the CIP 348 or the ISM-IRE 346. The IRESM 336 may then perform configuration verification/analysis operations on the software stack of the ISM-IRE 346, as indicate by arrow 392. In some embodiments, for example, one or more hash functions may be applied to various layers of the software of the ISM-IRE 346, and the output hash values may represent a signature of the software stack. In at least some embodiments, the IRESM 336 may perform attestation of the IRE software stack. The results of the configuration measurements/verification tests employed by the IRESM 336 may be provided to the verification requester in the depicted embodiment. The results may be passed from the IRESM to the ISM-IRE, from the ISM-IRE to the CIP, and eventually to the verification requester in such a scenario. In other embodiments, a different path may be used for the verification results than was used for the query. In at least some embodiments, in addition to the attestation/verification results and the nonce, the verification requester may also be provided (a) an indication of the identity of the IRESM, similar to a TLS certificate rooted at a trusted certificate authority and (b) an indication of the identity of the ISM-IRE and/or its parent compute instance (e.g., comprising one or more public keys of respective asymmetric key pairs). The verification requester may then verify that the attestation results and the identity information is acceptable, and if so, the ISM-IRE may be designated as being trusted and verified for computations that involve the use of the instance secrets. In some embodiments, the hash-value-based verification of the ISM-IRE software state may be performed at the VMCs 334. Note that in embodiments in which client-requested IRES are established at a compute instance, similar state verification procedures may be initiated by the client at various stages of the lifetime of the client-requested IRE.

One or more instance secrets 387 may be transferred from an external source 355 (such as the security secrets service) to the ISM-IRE in the depicted embodiment as part of operations 391, e.g., at the request of a secrets manager 388 within the ISM-IRE. In order to do so, a secure communication session or channel, similar to a TLS session, may be established between the external source 355 and the ISM-IRE in various embodiments. Within the compute instance 344, the CIP and local communication channel 349 may be used for such a secure session. Using one or more messages of the session, an encrypted version of an instance secret 387, which cannot be decrypted by the CIP even though the CIP passes on the messages of the session to/from the ISM-IRE, may be transferred safely to the ISM-IRE 346. The secrets manager 388 of the IRE 346 may then begin performing computations using the instance secret, such as generating signatures for requests from the less-trusted application components 356 to access remote resources. In some embodiments a secrets provisioning agent 357, such as a privileged operating system thread of the compute instance, may prompt the secrets manager to obtain an instance secret 387.

Figure 4:
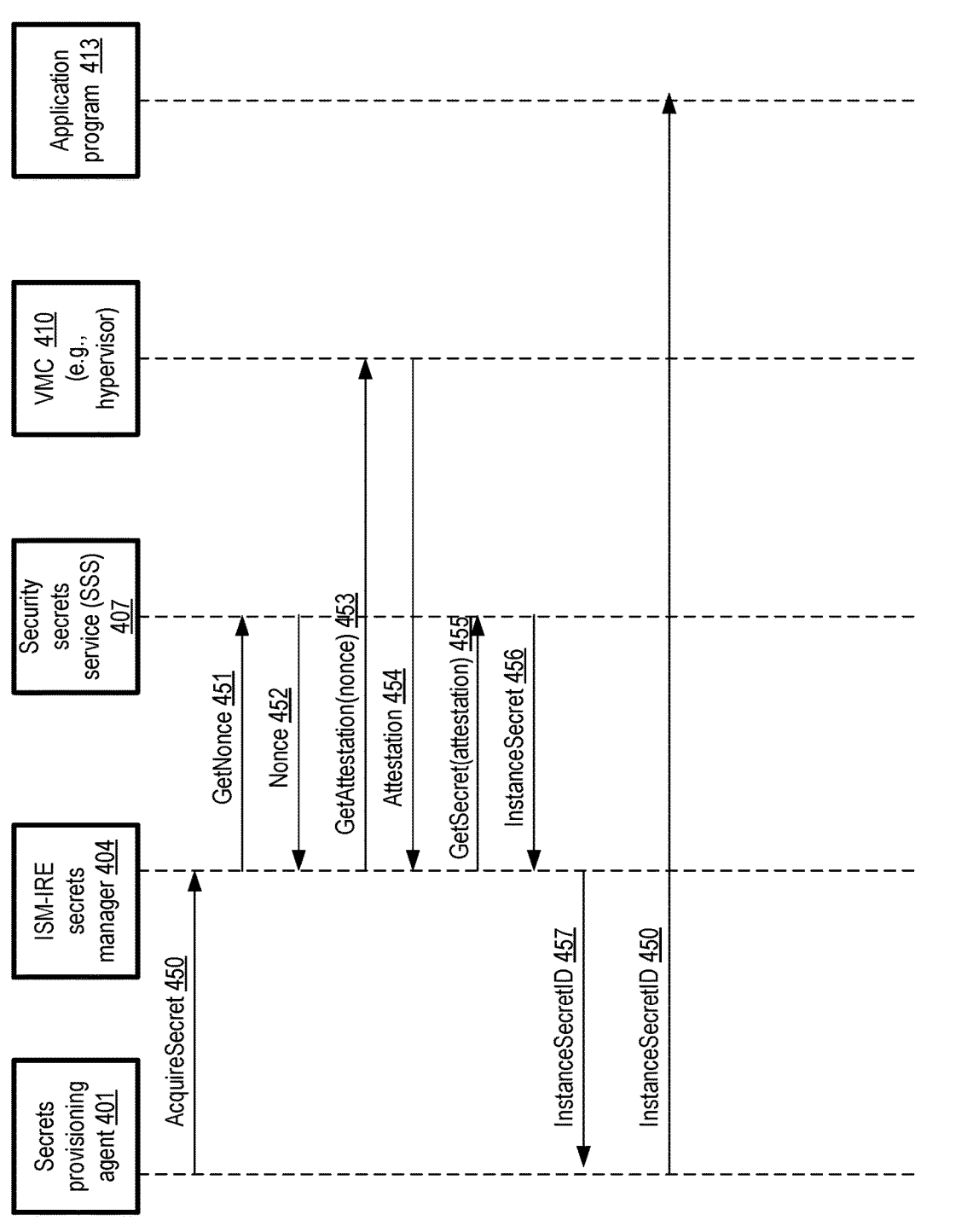
FIG. 4 illustrates example interactions associated with acquisition of instance secrets by a secrets manager running within an isolated runtime environment, according to at least some embodiments.

FIG. 4 illustrates example interactions associated with acquisition of instance secrets by a secrets manager running within an isolated runtime environment, according to at least some embodiments. In the depicted embodiment, the parent compute instance of an ISM-IRE may comprise a secrets provisioning agent 401, implemented for example as a privileged operating system process or thread over which the VCS client has no direct control. The secrets provisioning agent 401 may send an AcquireSecret request 450 to the ISM-IRE secrets manager 404 in the depicted embodiment. The timing of the AcquireSecret message relative to the time at which the ISM-IRE is launched may vary in different embodiments—e.g., in some embodiments, the AcquireSecret message may be sent during or shortly after the boot or launch of the ISM-IRE, while in other embodiments the AcquireSecret message may be sent later, e.g., in response to a determination by the secrets provisioning agent that a request for a remote access has been generated by an application program 413 or is about to be generated by an application program 413 which is starting up. In some embodiments, the secrets provisioning agent may not necessarily be implemented as part of the operating system as such; instead, for example some user mode program or the application program 413 itself may request the ISM-IRE secrets manager to acquire the secret. In at least one embodiment, the AcquireSecret request may indicate the authorization role for which the secret is to be obtained. In various embodiments, the owner of the parent compute instance (the VCS client at whose request the parent compute instance is launched) may create and assign the role using programmatic interfaces, prior to the steps shown in FIG. 4, and inform the SSS that the parent compute instance has been assigned the role.

In response to receiving the AcquireSecret request, the ISM-IRE secrets manager 404 may send a GetNonce request 451 to a security secrets service (SSS) 407 of the provider network, e.g., using a secure communication pathway which involves the use of a CIP and a local communication channel. The nonce (e.g., a pseudo-random number) may be used to tie various messages of the secrets acquisition procedure shown in FIG. 4 together; the sender of a request for an operation may include the nonce in the request, and only trust the response if it contains the same nonce, for example. Such nonces may be used in cryptographic systems to prevent copies of requests (submitted for example by malicious programs or entities that have managed to access contents of a request) from being successful. In some embodiments, an identifier of the parent compute instance and a role assigned to the parent compute instance may be supplied as part of the GetNonce request, and used in the computations used to generate the nonce at the STS. In one embodiment, the VCS may maintain an instance profile for each compute instance, indicating various properties of the compute instance including the role(s) assigned to the compute instance, and the profile may be included in the GetNonce request and utilized to generate the nonce. The nonce may be provided to the ISM-IRE by the STS, as indicated by arrow 452.

According to at least some embodiments, as indicated earlier, the software state of the virtualization server may be verified before the SSS generates an instance secret for the secrets manager. In the embodiment depicted in FIG. 4, the secrets manager 404 may request an attestation document or attestation object indicative of the software state from the virtualization server's virtualization management component (VMC) (e.g., a hypervisor) 410, by sending a GetAttestation request 453 to the VMC. Parameters of the GetAttestation request 453 may include the nonce in some embodiments (which may help confirm to the VMC that the request is from a legitimate ISM-IRE). In one embodiment in which the virtualization server comprises a physical Trusted Platform Module (TPM) or a virtualized TPM, contents of the TPM which indicate measurements of software state of the virtualization server may be included in the GetAttestation request. In other embodiments, data obtained from the TPM may not be used for the attestation. In some embodiments, the software of the ISM-IRE may be attested, without attesting the rest of the software stack of the virtualization server. In other embodiments, the software of the ISM-IRE, parent compute instance, and/or the VMC itself may be attested. The VMC may generate the attestation document 454, and provide a digitally signed version of the attestation document/object to the secrets manager in the depicted embodiment. The attestation document or object may in effect indicate that the VMC has verified that the ISM-IRE is legitimate (i.e., that the state of software used for the ISM-IRE has been verified).

The secrets manager may include the signed attestation document or object in a GetSecret request 455 sent to the SSS 407 in the depicted embodiment. Parameters of the GetSecret request may indicate or include the role for which the secret is to be generated in some implementations. For example, in one implementation the GetSecret request may indicate the identifier of the compute instance, and the SSS may have been informed earlier by the VCS client regarding the role or roles assigned to the compute instance. The SSS may examine the attestation document and generate an instance secret 456 if the attestation information is satisfactory or validated successfully in the depicted embodiment. The instance secret may then be sent back to the secrets manager 404, e.g., along with other security data generated by the SSS such as a session token and a key identifier that are also used in the process of signing requests for remote applications and. In some implementations, the secrets manager may then provide a response to the secrets provisioning agent's AcquireSecret request 450. A token referred to as the instance secret identifier or InstanceSecretID 457 may be sent to the secrets provisioning agent, in effect indicating that the instance secret has been acquired or provisioned by the secrets manager. In one such embodiment, the InstanceSecretID may be provided by the secrets provisioning agent to the application program 413 from which requests to access remote resources originate. Note that the InstanceSecret itself may not be exposed by the secrets manager to the secrets provisioning agent; instead, the InstanceSecretID, which can server as a pointer or reference to the InstanceSecret (and in some implementations to the other security data such as a session token and/or a key identifier), may be exposed to the secrets provisioning agent (and from the agent to the application program 413).

Figure 5:
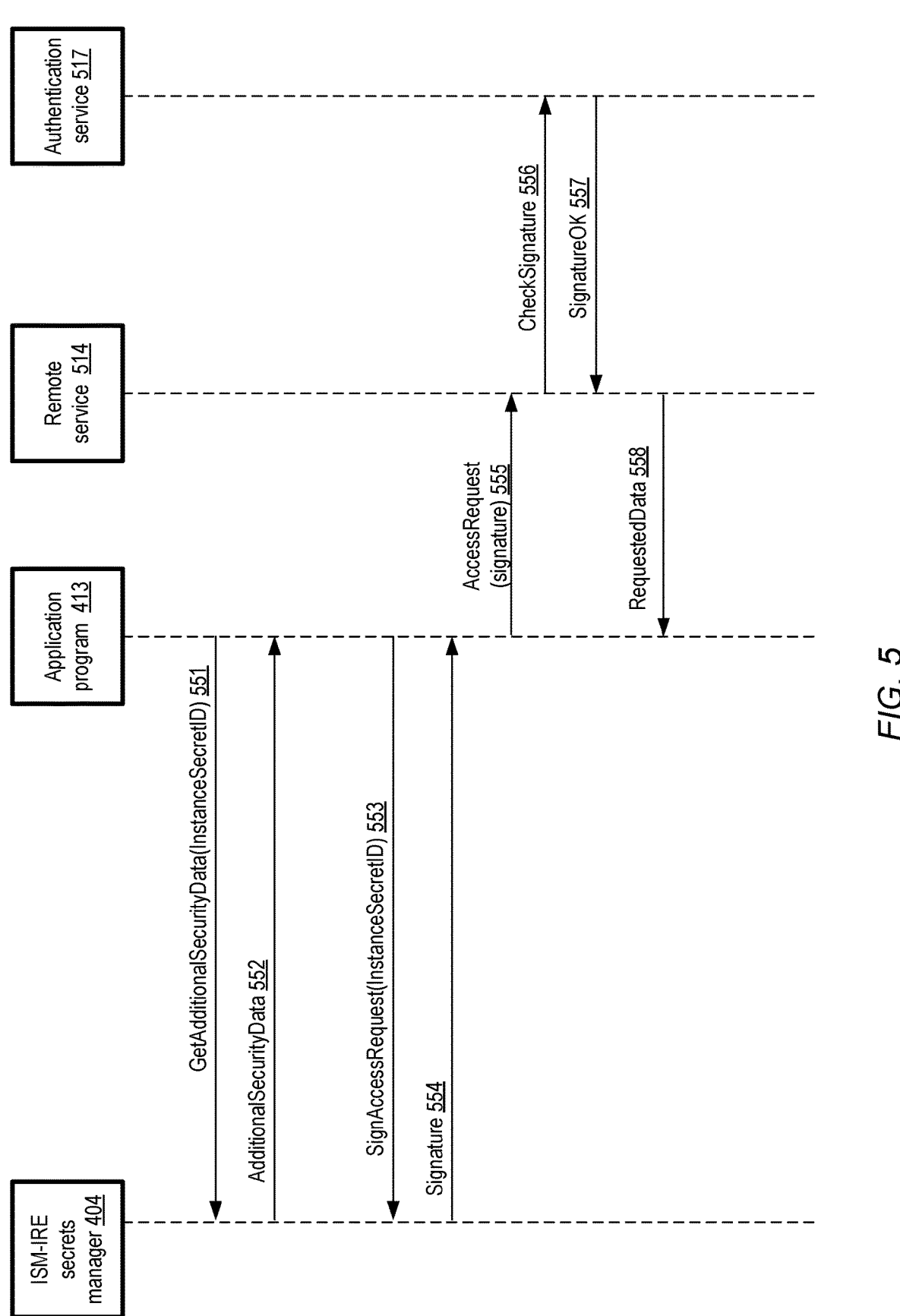
FIG. 5 illustrates example interactions associated with the transmission of access requests for which signatures are generated by a secrets manager running within an isolated runtime environment, according to at least some embodiments.

FIG. 5 illustrates example interactions associated with the transmission of access requests for which signatures are generated by a secrets manager running within an isolated runtime environment, according to at least some embodiments. After the instance secrets have been acquired at the secrets manager using the operations indicated in FIG. 4, in some embodiments the application program 413 may send a request to the secrets manager 404 for additional security data that is used in the pre-signature portion of the preparation of remote requests. Such a request may comprise a GetAdditionalSecurityData request 551, whose parameters may include the InstanceSecretID that was earlier provided by the secrets manager to the application program via the secrets provisioning agent. The response AdditionalSecurityData 552 message may include, for example, an account key identifier of the client on whose behalf the parent compute instance was established, a session token which can be used to control the expiry of requests and/or instance secrets, and so on. In at least some embodiments, the additional security data may not have to be protected to the same extent as the instance secret; however, the secrets manager 404 may nevertheless be used to provide the additional security data to the application program.

A request to access a remote resource may be generated at the application program 413, and a corresponding string to sign may be generated at or by the application (e.g., by an SDK component or a command-line tool) as described earlier in the context of FIG. 2. The string to sign may be indicated in SignAccessRequest 553 sent from the application program 413 to the secrets manager, e.g., using a communication intermediary process (CIP) and a local communication channel of the kind shown in FIG. 3. The InstanceSecretId may be included among the parameters of the SignAccessRequest message in some embodiments. A signature 554 of at least a portion of the request may be generated using the instance secret by the secrets manager, and sent to the application program 413 in the depicted embodiment. The application program may then sent the AccessRequest 555, along with the signature generated for the request, to a resource manager of the remote service 514 which manages the targeted resource to which access is desired. The resource manager may in turn send a request to validate the signature (in CheckSignature message 556) to an authentication service 517 (also referred to as an authorization service) in some embodiments. If the signature is validated, a SignatureOK message 557 may be sent from the authentication service to the resource manager of the remote service 514 in the depicted embodiment; if the signature is not valid, a message indicating that the signature is not valid may be sent instead in at least some embodiments. After the resource manager determines that the signature was valid, access to the resource may be granted to the application program, e.g., and the requested data (in the case of a read request) may be provided in a RequestedData message 558. If the access involved a write to a data object, the write may be performed on the data object and an indication that the write succeeded may be provided in one embodiment. In some embodiments, an authentication service 517 may not be needed, and the resource manager of the remote service 514 may validate the signature itself. In one embodiment, in addition to the signature, a session token or other metadata which identifies the compute instance from which the access request originates and/or the ISM-IRE of that compute instance may also be sent from the application program to the remote service, and used (e.g., at the authentication service) to perform additional validation checks before the signature is approved.

Figure 6:
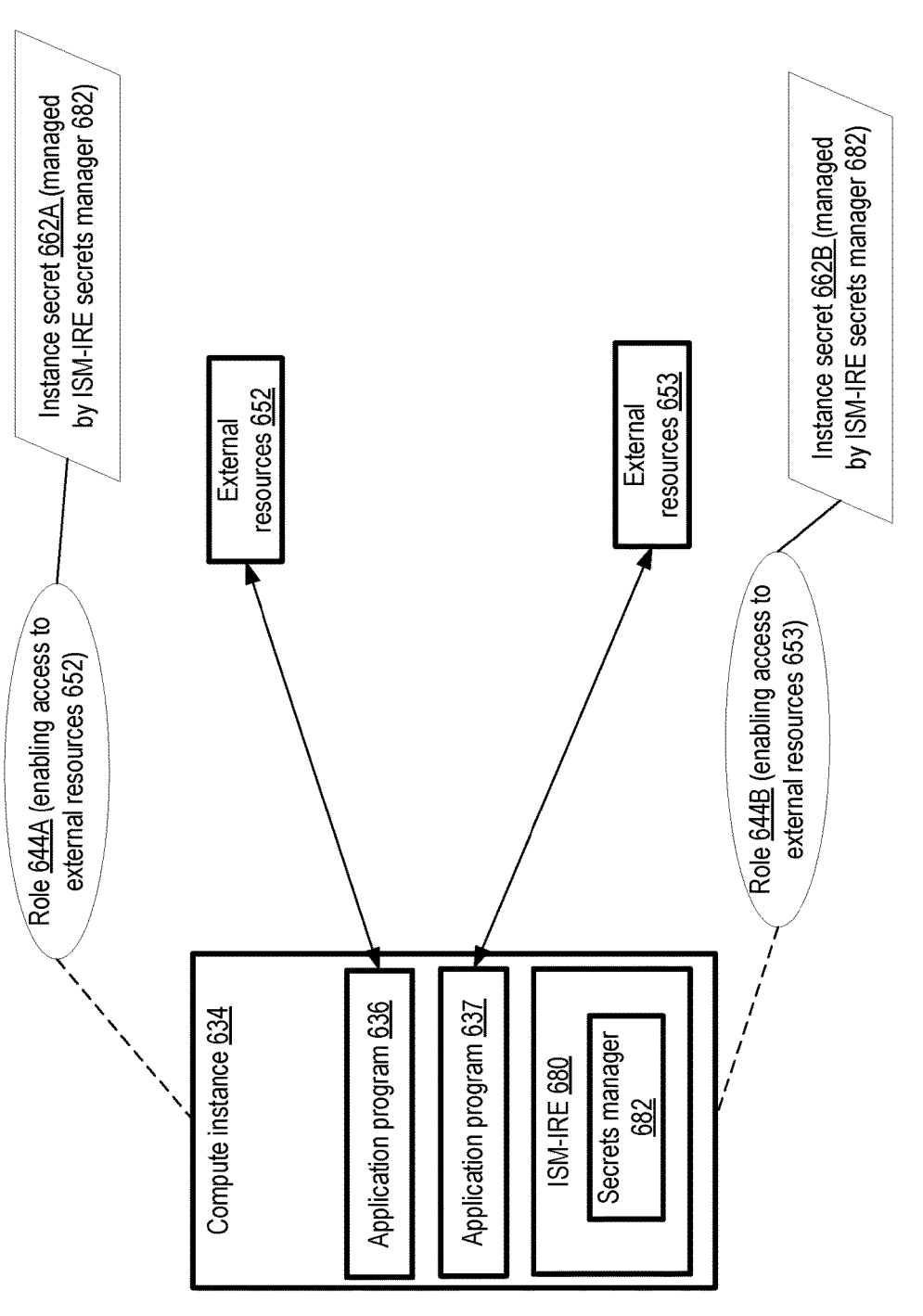
FIG. 6 illustrates an example scenario in which multiple authorization roles, each with a respective associated instance secret, may be assigned to a single compute instance, according to at least some embodiments.

FIG. 6 illustrates an example scenario in which multiple authorization roles, each with a respective associated instance secret, may be assigned to a single compute instance, according to at least some embodiments. A compute instance 634 of a VCS similar to VCS 110 of FIG. 1 comprises application program 636 and application program 637 in the example scenario depicted in FIG. 6. An ISM-IRE 680, comprising a secrets manager 682, has been launched using a subset of compute instance 634's memory.

Application program 636 needs to access remote external resources 652, while application program 637 needs to access remote external resources 653. External resources 652 may be part of, or managed by, a different network-accessible service of the provider network than external resources 653 in some cases; in other cases, both sets of external resources may be part of the same service. In some cases, one or both sets of external resources may not be located at a data center of the provider network; for example, one set of external resources may be located at a premise of a client of the provider network.

In order, for example, to prevent application program 636 from accessing external resources 653, and/or in order to prevent application program 637 from accessing external resources 652, the client on whose behalf compute instance 634 is launched may create and assign two different authorization roles for the compute instance in the depicted embodiment, e.g., using programmatic interfaces implemented by the VCS. Role 644A may enable access to external resources 652 (and not enable to external resources 653), while role 644B may enable access to external resources 653 (and not enable access to external resources 652). Distinct instance secrets 662A and 662B, corresponding to role 644A and role 644B respectively, may be obtained and managed by secrets manager 682. Requests to access external resources 652 from application program 636 may be signed by the secrets manager using instance secret 662A, while requests to access external resources 653 from application program 637 may be signed by the secrets manager using instance secret 662B in the depicted example scenario. In various embodiments, any number of roles may be assigned to a compute instance associated with an ISM-IRE, and secrets corresponding to each of the roles may be managed at a single ISM-IRE.

As mentioned earlier, in some embodiments VCS clients may wish to launch their own IREs, and use the IREs to manager secrets other than instance secrets as signed to compute instances. FIG. 7 illustrates an example scenario in which multiple isolated runtime environments may be established within a compute instance, according to at least some embodiments. A compute instance (CI) 734 has been launched at a VCS virtualization server in response to an instance launch request from a VCS client C1 in the depicted scenario. An ISM-IRE 740 has been launched automatically by the VCS within compute instance 734, and a segregated memory subset 778 of the overall memory 777 initially assigned to the parent compute instance 734 has been set aside for use by the ISM-IRE 740. A secrets manager running within ISM-IRE 740 utilizes instance secrets assigned to CI 734 in accordance with a cloud provider protocol for remote resource access, enabling application program 736 to access remote resources in accordance with an authorization role assigned to the CI 734.

Client C1 may also wish to execute other security-related computations using an isolated runtime environment in the depicted embodiment. Since the ISM-IRE is set up by the VCS specifically for managing instance secrets, the client C1 may not be provided access to ISM-IRE in the depicted embodiment. Instead, client C1 may submit a programmatic request to the VCS control plane, asking for the establishment of a second IRE, labeled client-requested IRE 744 in FIG. 7. A second segregated memory subset 779 may be utilized for client-requested IRE 744 in the depicted embodiment, and a second secrets manager may be run within the client-requested IRE 744. This secrets manager may be provided security secrets (to be used, for example, on behalf of application program 737) from a source indicated by the client C1, using a local communication channel similar to the channel 349 shown in FIG. 3. In some implementations, the same communication intermediary process (similar to CIP 348 of FIG. 3) may be shared by the ISM-IRE and the client-requested IRE; in other implementations, separate CIPs may be used. The client-requested IREs may share many of the properties and characteristics (e.g., the restrictions on network and persistent storage I/O) discussed earlier for ISM-IREs. The differences between the client-requested and ISM-IREs may include that (a) the VCS control plane may cause the ISM-IRE to be launched, without receiving a request from the client, while the client-requested IRE may be launched only if the client requests it, (b) the sources of the security secrets used may differ, and (c) the client-requested IRE may be terminated at the request of the client, while the ISM-IRE may not. Multiple client-requested IREs may be established in some embodiments if desired. In one embodiment, multiple ISM-IREs may be launched at a single compute instance to which multiple roles have been assigned, with each ISM-IRE being used to manage and use respective instance secrets corresponding to one of the multiple roles.

Figure 8:
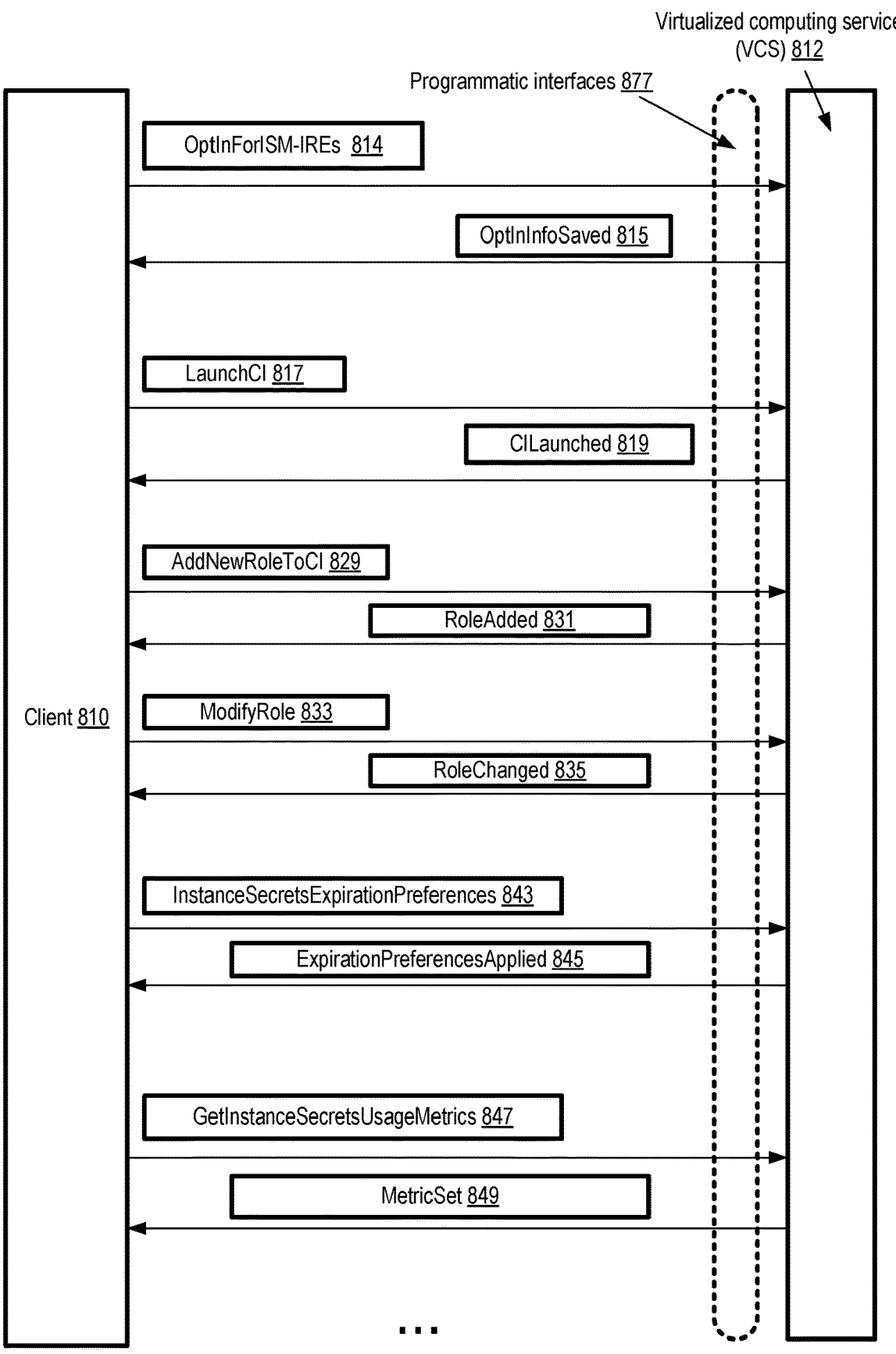
FIG. 8 illustrates example programmatic interactions, related to instance secrets management, between clients and a virtualized computing service, according to at least some embodiments.

FIG. 8 illustrates example programmatic interactions, related to instance secrets management, between clients and a virtualized computing service, according to at least some embodiments. A VCS 812, similar in features and functionality to VCS 110 of FIG. 1, may implement a set of programmatic interfaces 877 in the depicted embodiment, such as a web-based console, command-line tools, application programming interfaces (APIs), graphical user interfaces and the like. A VCS client 810 may submit an OptInForISM-IREs message 814 via the programmatic interface, indicating that the client wishes to have ISM-IREs set up automatically as needed for the client's compute instances. A record indicating that the client has opted in to the use of instance secret protection techniques using ISM-IREs may be stored, e.g., along with client account metadata, at the VCS control plane, and an OptInInfoSaved messages 815 may be sent to the client in the depicted embodiment. In some embodiments, instead of requiring VCS clients to explicitly opt in, the VCS may inform clients that the ISM-IRE feature is on by default for at least some categories of compute instances, and that the client may programmatically opt out from the use of ISM-IREs if desired. In some embodiments, the VCS may provide information, e.g., via a web site, about the amount of compute instance memory that may be set aside for an ISM-IRE, so that clients are made aware that ISM-IREs will consume some of the compute instance memory.

A client may submit a LaunchCI request 817 for a compute instance in the depicted embodiment. In one embodiment, a client may specify, as a parameter of the LaunchCI request, an authorization role intended to be used by programs running within the CI. If the ISM-IRE feature is enabled (e.g., either by default or after the client opts in) for the type of instance requested by the client, in some embodiments the VCS control plane may launch an ISM-IRE using a subset of the compute instance memory as part of the initialization or setup of the requested compute instance. In other embodiments, the launch of the ISM-IRE may be deferred until later in the lifetime of the compute instance, e.g., until an indication is received that programs running in the compute instance are to access remote resources. A CILaunched message 819 may be sent to the client in at least some embodiments after the compute instance is launched.

In various embodiments the VCS client may submit an AddNewRoleToCI request 829 via programmatic interfaces 877, indicating a new authorization role to be assigned to a specified compute instance. The VCS control plane may store information about the new role assignment, and send a RoleAdded message 831 back to the client. In some embodiments, for each role added, a corresponding instance secret (or secrets) may be obtained by a secrets manager running within the ISM-IRE of the compute instance.

Clients may sometimes wish to modify (or remove) authorization roles that are assigned to a compute instance. A ModifyRole request 833 specifying the changes (e.g., permissions to access additional remote resources, removal of permissions to access some resources, etc.) may be submitted via programmatic interfaces 877 in some embodiments. An indication of the changes may be stored at the VCS control plane, and a RoleChanged message 835 may be sent to the client in the depicted embodiment. In some embodiments, role information may be stored at an access management service or an identity and roles management service similar to IRMS 162 of FIG. 1, instead of or in addition to being stored at the VCS itself. In one such embodiment, if a client wishes to modify a role, the corresponding request may be sent to the access management service or IRMS, and that service may notify the VCS of any changes for which actions may need to be taken by the VCS. In response to a role change, in some embodiments the VCS control plane may cause the secrets manager of the ISM-IRE of the compute instance(s) to which the role is assigned to refresh or re-acquire instance secrets corresponding to the changed role.

In various embodiments, a VCS client 810 may provide preferences or requirements related to the expiration of instance secrets. For example, the client may wish to set the maximum amount of time that an instance secret remains valid, or the maximum number of remote resource access requests for which a given instance secret can be used, after which a new version of the instance secret has to be acquired by the ISM-IRE's secrets manager. Expiring secrets in this manner can further reduce the extent to which secrets can be misused. A client may submit an InstanceSecretsExpiration-Preferences message 843 indicating one or more criteria which should be used for the instance secrets of one or more of the client's compute instances in the depicted embodiment. The preferences may be stored by the VCS control plane, and an ExpirationPreferencesApplied message 845 may be sent to the client that the preferences are being enforced.

The VCS control plane (and/or control planes of other services at which the remote resources accessed from compute instances are managed) may capture various metrics related to the remote accesses for which instance secrets are used in some embodiments, such as the number of remote accesses per unit time, log records of such accesses indicating which specific remote resources were accessed, and so on. In one embodiment, a client may submit a GetInstanceSecretsUsageMetrics request 847 to view at least some of the metrics associated with a given set of compute instances or a given set of roles. The requested metrics may be provided to the client in one or more MetricSet messages 849. It is noted that other types of programmatic interactions pertaining to the use of ISM-IREs may be supported by a VCS in some embodiments than those shown in FIG. 8.

FIG. 9 is a flow diagram illustrating aspects of operations which may be performed to use isolated runtime environments to manage instance secrets, according to at least some embodiments. As shown in element 901, a control plane server (CPS) of a VCS similar in features and functionality to VCS 110 of FIG. 1 may receive an indication that enhanced secrets management techniques are to be implemented using IREs for secrets that are used to secure requests for remote resources from one or more of a VCS client's compute instances (CIs). The client may submit a message indicating that the client has opted in for the use of such IREs, for example.

A compute instance CI1 may be launched at a virtualization server VS in response to an instance launch request from the client (element 904). An ISM-IRE may be launched automatically within CI1 in various embodiments, without receiving a request to launch the ISM-IRE (element 907). A portion of the memory assigned to CI1 may be set aside for use by the ISM-IRE in various embodiments. This segregated portion of memory may be inaccessible to any programs (including other programs running at CI1) that are not run within the ISM-IRE itself. Network communication may be prohibited from the ISM-IRE, and access to persistent storage may also be prohibited from the ISM-IRE in at least some embodiments. A secure local communication channel of the kind shown in FIG. 3, with an associated communication intermediary process (CIP), may provide a means of communication between the ISM-IRE and external entities in some embodiments.

A secrets manager (SM) running within the ISM-IRE may obtain or determine one or more instance secrets (such as cryptographic keys) associated with an authorization role assigned to CI1 (element 910) in the depicted embodiment. The role may be defined by, and/or assigned to CI1, by the client on whose behalf CI1 is established in at least some embodiments. The instance secrets may not be accessible from programs running within CI1 that are not running within the ISM-IRE in various embodiments.

The SM may obtain an indication of a request, generated by an application running within CI1, to access one or more remote resources external to CI1 (element 913). The remote resources may, for example, include data stored at another service of the provider network at which the VCS is implemented, such as a storage service, a machine learning service, or a database service.

The SM may generate, using an instance secret, a security artifact (such as a digital signature of at least a portion of the request) associated with the remote access request (element 916) in various embodiments. The security artifact may be transferred, transmitted or provided to the application from the SM, without revealing the instance secret itself to the application (element 919). The application may then transmit the security artifact, along with the request itself, to a resource manager of the remote resource(s) for which access is desired (element 922). If the resource manager determines that the security artifact is valid and that CI1 is therefore permitted to access the requested resource(s), the application may obtain access to the resource(s) (element 928) in the depicted embodiment. In some embodiments the resource manager may utilize another service, such as an authorization/authentication service of the provider network, to determine whether the artifact is valid; in other embodiments, the resource manager may make the validity/invalidity determination itself.

It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Figure 10:
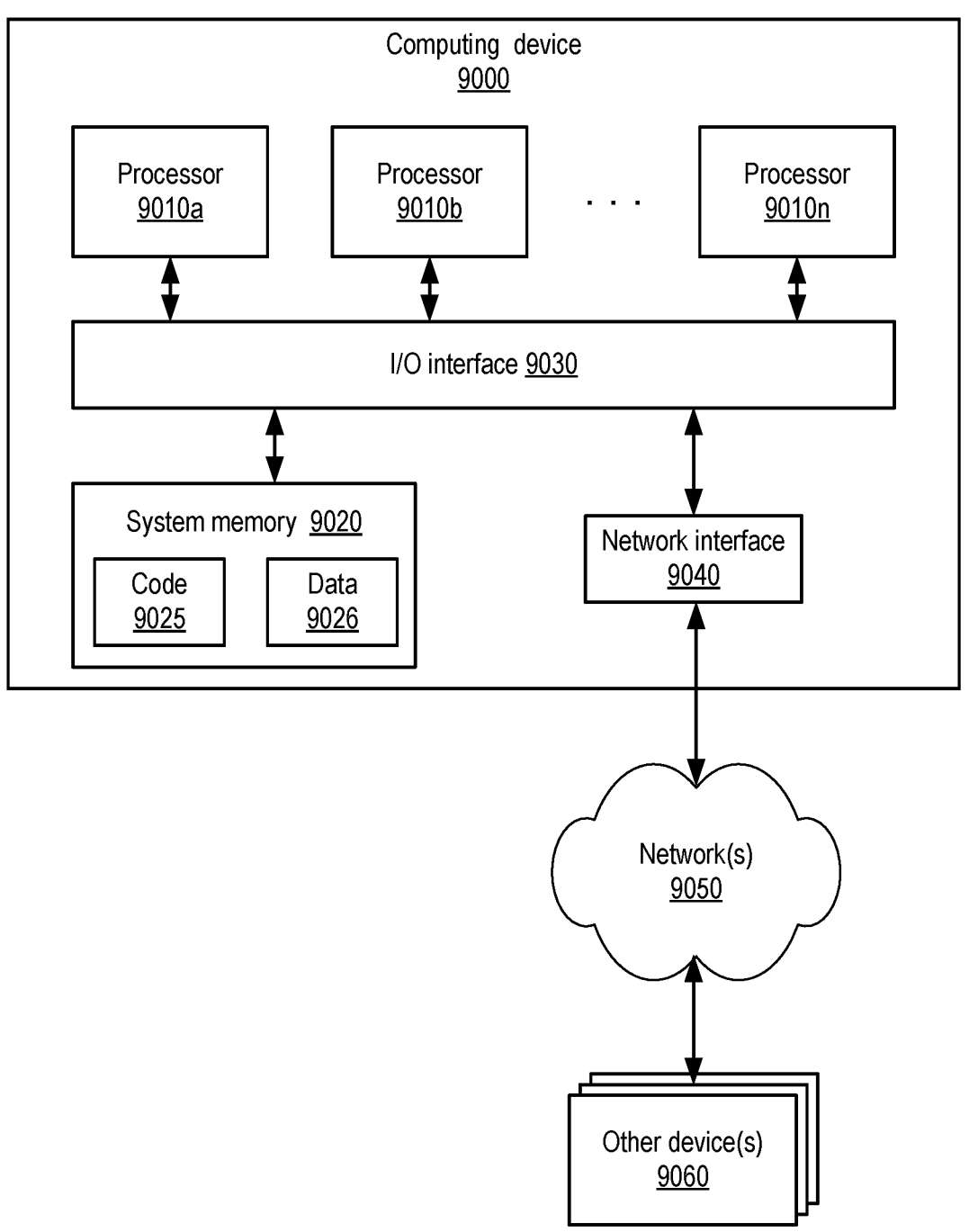
FIG. 10 is a block diagram illustrating an example computing device that may be used in at least some embodiments.

In at least some embodiments, a server that implements the types of techniques described herein (e.g., including functions of a VCS, a security secrets service, a storage service, a database service, an authorization/authentication service, an identity and roles management service, and/or other services of a cloud provider network) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

a control plane server of a virtualized computing service of a cloud provider network;

a virtualization server of the virtualized computing service; and a resource manager of a collection of resources of another service of the cloud provider network;

wherein the control plane server comprises one or more processors and corresponding memory and is configured to:

cause an instance secrets management isolated runtime environment to be launched at the virtualization server, wherein the instance secrets management isolated runtime environment uses a subset of memory assigned to a compute instance of the virtualization server, wherein the instance secrets management isolated runtime environment is launched without receiving a launch request for the instance secrets management isolated runtime environment from a client of the virtualized computing service on whose behalf the compute instance is launched, wherein the subset of memory is inaccessible from programs running outside the instance secrets management isolated runtime environment, wherein network communication with endpoints outside the virtualization server is prohibited from the instance secrets management isolated runtime environment, and wherein the instance secrets management isolated runtime environment comprises a secrets manager;

wherein the secrets manager is configured to:

determine, from a security service of the cloud provider network, a cryptographic key associated with an authorization role assigned to the compute instance, without receiving a request from the client to determine the cryptographic key, wherein the cryptographic key is not accessible by programs that are (a) running at the virtualization server and (b) not running within the instance secrets management isolated runtime environment; and obtain an indication of a request, generated by an application running within the compute instance, to access a resource of the collection of resources; and provide, to the application, a signature associated with at least a portion of the request, wherein the signature is generated by the secrets manager using at least the cryptographic key; and wherein the resource manager is configured to:

provide, to the application, access to the resource in response to a determination that the signature is acceptable and the authorization role permits access to the resource.

2. The system as recited in claim 1, wherein the control plane server is further configured to:

verify, prior to causing the instance secrets management isolated runtime environment to be launched, that the client has not opted out of a use of instance secrets management isolated runtime environments.

3. The system as recited in claim 1, wherein the control plane server is further configured to:

obtain, via a programmatic interface from the client, an indication of an expiration criterion for one or more security secrets managed by the secrets manager, including the cryptographic key; and wherein the secrets manager is further configured to:

obtain a replacement cryptographic key in accordance with the expiration criterion.

4. The system as recited in claim 1, wherein the cryptographic key is obtained at the secrets manager after validation of at least a portion of installed software of the virtualization server.

5. The system as recited in claim 1, wherein the control plane server is further configured to:

obtain an indication, from the client via a programmatic interface, that the authorization role is to be assigned to the compute instance.

6. A computer-implemented method, comprising:

launching an instance secrets management isolated runtime environment using a first subset of memory assigned to a compute instance of a virtualization server of a virtualized computing service, without receiving a request for the instance secrets management isolated runtime environment from a client on whose behalf the compute instance is launched, wherein the first subset of memory is inaccessible from programs running outside the instance secrets management isolated runtime environment, and wherein the instance secrets management isolated runtime environment comprises a first secrets manager;

generating, by the first secrets manager using a first security secret associated with the compute instance, a first security artifact, wherein the first security secret is not accessible to programs that are running within the compute instance and are not running within the instance secrets management isolated runtime environment;

providing, to an application within the compute instance by the first secrets manager within the instance secrets management isolated runtime environment launched using the first subset of memory assigned to the compute instance, the first security artifact associated with a request to access a first resource from the application; and obtaining, by the application, in response to a determination that the first security artifact is valid, access to the first resource.

7. The computer-implemented method as recited in claim 6, further comprising:

obtaining, via a programmatic interface, a request from the client to assign a first authorization role to the compute instance, wherein the first security secret is generated based at least in part on the first authorization role, and wherein the first authorization role grants the compute instance permission to access the first resource.

8. The computer-implemented method as recited in claim 7, further comprising:

obtaining, via the programmatic interface, a request from the client to assign a second authorization role to the compute instance, wherein the second authorization role grants the compute instance permission to access a second resource; and providing, to another application within the compute instance by the first secrets manager, another security artifact associated with a request to access the second resource from the other application, wherein the other security artifact is generated by the first secrets manager using a second security secret associated with the second authorization role, wherein the second security secret is not accessible to programs that are running within the compute instance and are not running within the instance secrets management isolated runtime environment.

9. The computer-implemented method as recited in claim 6, further comprising:

obtaining, via a programmatic interface, an indication that the client has opted in to use of the instance secrets management isolated runtime environment, wherein the instance secrets management isolated runtime environment is launched based at least in part on the indication.

10. The computer-implemented method as recited in claim 6, further comprising:

obtaining, via a programmatic interface from the client, an indication of an expiration criterion for one or more security secrets managed by the first secrets manager, including the first security secret; and obtaining, by the first secrets manager, a replacement security secret for the first security secret in accordance with the expiration criterion.

11. The computer-implemented method as recited in claim 6, further comprising:

validating at least a portion of installed software of the virtualization server prior to providing the first security secret to the first secrets manager.

12. The computer-implemented method as recited in claim 6, further comprising:

obtaining the first security secret by the first secrets manager during a boot procedure of the instance secrets management isolated runtime environment, prior to generation of the request to access the first resource.

13. The computer-implemented method as recited in claim 6, further comprising:

obtaining the first security secret by the first secrets manager in response to an indication of the request to access the first resource.

14. The computer-implemented method as recited in claim 6, further comprising:

utilizing, by the first secrets manager, one or more shared memory buffers to communicate with entities external to the instance secrets management isolated runtime environment.

15. The computer-implemented method as recited in claim 6, further comprising:

launching a client-requested isolated runtime environment using a second subset of memory assigned to the compute instance; and utilizing, by a second secrets manager running within the client-requested isolated runtime environment, a second security secret to generate a second security artifact to be utilized by another application running within the compute instance, wherein the second security secret is obtained from a source indicated by the client, and wherein the second security secret is not accessible by the first secrets manager.

16. A non-transitory computer-accessible storage medium storing program instructions that when executed on a processor:

cause an instance secrets management isolated runtime environment to be launched at a virtualization server of a virtualized computing service, wherein the instance secrets management isolated runtime environment utilizes a subset of memory assigned to a compute instance of the virtualization server, wherein the subset of memory is inaccessible from programs running outside the instance secrets management isolated runtime environment, and wherein the instance secrets management isolated runtime environment comprises a secrets manager;

generate, by the secrets manager using a first security secret associated with the compute instance, a first security artifact, wherein the first security secret is not accessible to programs that are running within the compute instance and are not running within the instance secrets management isolated runtime environment;

provide, to an application within the compute instance by the secrets manager within the instance secrets management isolated runtime environment launched using the subset of memory assigned to the compute instance, the security artifact associated with a request to access a resource from the application; and obtain, by the application, in response to a determination that the security artifact is valid, access to the resource.

17. The non-transitory computer-accessible storage medium as recited in claim 16, wherein the security secret is generated based at least in part on an authorization role assigned to the compute instance by a client on whose behalf the compute instance is launched, and wherein the authorization role grants the compute instance permission to access the resource.

18. The non-transitory computer-accessible storage medium as recited in claim 16, wherein the instance secrets management isolated runtime environment is launched after a determination is made that a client on whose behalf the compute instance is launched has opted in to use of at least one instance secrets management isolated runtime environment.

19. The non-transitory computer-accessible storage medium as recited in claim 16, storing further program instructions that when executed on the:

cause the secrets manager to obtain a replacement for the security secret in accordance with an expiration criterion for security secrets, wherein the expiration criterion is indicated by a client on whose behalf the compute instance is launched.

20. The non-transitory computer-accessible storage medium as recited in claim 16, wherein the resource comprises one or more of: (a) a data item stored at an object storage service, or (b) a data item stored at a database service.

* * * * *